US012587642B2

(12) United States Patent
Dai

(10) Patent No.: US 12,587,642 B2
(45) Date of Patent: Mar. 24, 2026

(54) ENCODING METHOD, DECODING METHOD, CODE STREAM, ENCODER, DECODER AND STORAGE MEDIUM

(71) Applicant: GUANGDONG OPPO MOBILE TELECOMMUNICATIONS CORP., LTD., Dongguan (CN)

(72) Inventor: Zhenyu Dai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/534,485

(22) Filed: Dec. 8, 2023

(65) Prior Publication Data

US 2024/0107015 A1     Mar. 28, 2024

Related U.S. Application Data

(63) Continuation of application No. PCT/CN2021/099234, filed on Jun. 9, 2021.

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/70* (2014.11); *H04N 19/82* (2014.11)

(58) Field of Classification Search
CPC .... H04N 19/117; H04N 19/176; H04N 19/70; H04N 19/82
See application file for complete search history.

(56) References Cited

U.S. PATENT DOCUMENTS

| | | | | |
|---|---|---|---|---|
| 2019/0273948 A1* | 9/2019 | Yin | ......................... | G06N 3/045 |
| 2022/0101095 A1* | 3/2022 | Li | ........................... | G06N 3/042 |
| 2022/0383554 A1* | 12/2022 | Jiang | ...................... | H04N 19/82 |

FOREIGN PATENT DOCUMENTS

| | | |
|---|---|---|
| CN | 108184129 A | 6/2018 |
| CN | 108520505 A | 9/2018 |

(Continued)

OTHER PUBLICATIONS

Y. Wang, H. Zhu, Y. Li, Z. Chen and S. Liu, "Dense Residual Convolutional Neural Network based In-Loop Filter for HEVC," 2018 IEEE Visual Communications and Image Processing (VCIP), Taichung, Taiwan, 2018, pp. 1-4 (Year: 2018).*

(Continued)

*Primary Examiner* — Dave Czekaj
*Assistant Examiner* — Shanika M Brumfield
(74) *Attorney, Agent, or Firm* — BAYES PLLC

(57) ABSTRACT

Disclosed in the embodiments of the present application are an encoding method, a decoding method, a code stream, an encoder, a decoder and a storage medium. The decoding method comprises: parsing a code stream, and determining a value of first syntax element identification information; when the first syntax element identification information indicates that the current block is allowed to use a preset selection network model to perform model selection, determining the preset selection network model of the current block, and according to the preset selection network model, determining a loop filtering network model used by the current block; and performing filtering processing on the current block by using the loop filtering network model, so as to obtain a reconstructed image block of the current block.

19 Claims, 15 Drawing Sheets

(51) Int. Cl.
   H04N 19/70       (2014.01)
   H04N 19/82       (2014.01)

(56)                References Cited

FOREIGN PATENT DOCUMENTS

| CN | 110351568 | A |   | 10/2019 |   |   |
| CN | 114596223 | A | * | 6/2022 |   |   |
| CN | 118266222 | A | * | 6/2024 | .......... | H04N 19/117 |
| WO | 2021006624 | A1 |   | 1/2021 |   |   |
| WO | WO-2022072659 | A1 | * | 4/2022 | ............ | G06N 3/045 |
| WO | WO-2022225643 | A1 | * | 10/2022 | .............. | G06N 3/08 |

OTHER PUBLICATIONS

Yin, Hujun et al. "AHG9: Adaptive convolutional neural network loop filter (JVET-M0566)" Joint Video Experts Team (JVET) of ITU-T SG 16 WP 3 and ISO/IEC JTC 1/SC 29/WG 11 13th Meeting: Marrakesh, Jan. 31, 2019 (Jan. 31, 2019), pp. 1-7. 9 pages.
International Search Report in the international application No. PCT/CN2021/099234, mailed on Mar. 9, 2022. 5 pages with English translation.
Written Opinion of the International Search Authority in the international application No. PCT/CN2021/099234, mailed on Mar. 9, 2022. 6 pages with English translation.

* cited by examiner

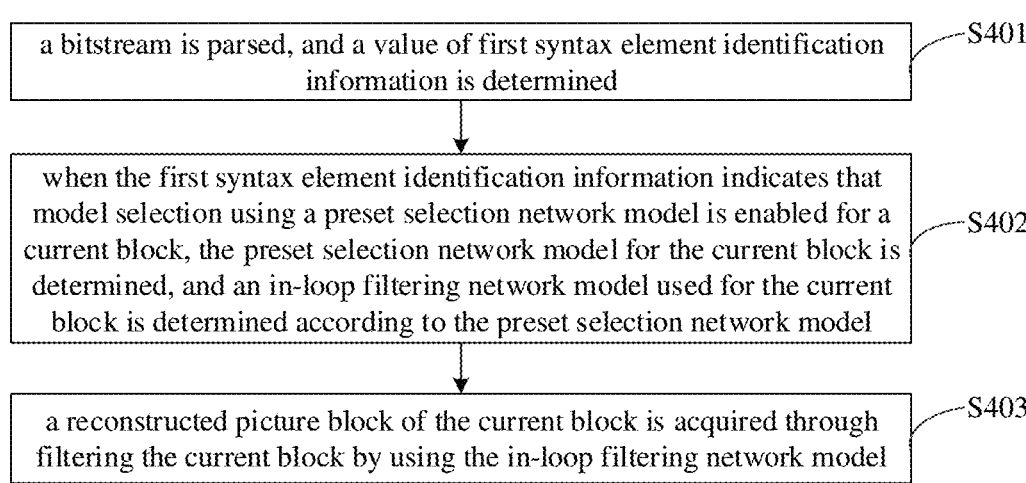

a bitstream is parsed, and a value of first syntax element identification information is determined — S401 when the first syntax element identification information indicates that model selection using a preset selection network model is enabled for a current block, the preset selection network model for the current block is determined, and an in-loop filtering network model used for the current block is determined according to the preset selection network model — S402 a reconstructed picture block of the current block is acquired through filtering the current block by using the in-loop filtering network model — S403

FIG. 4

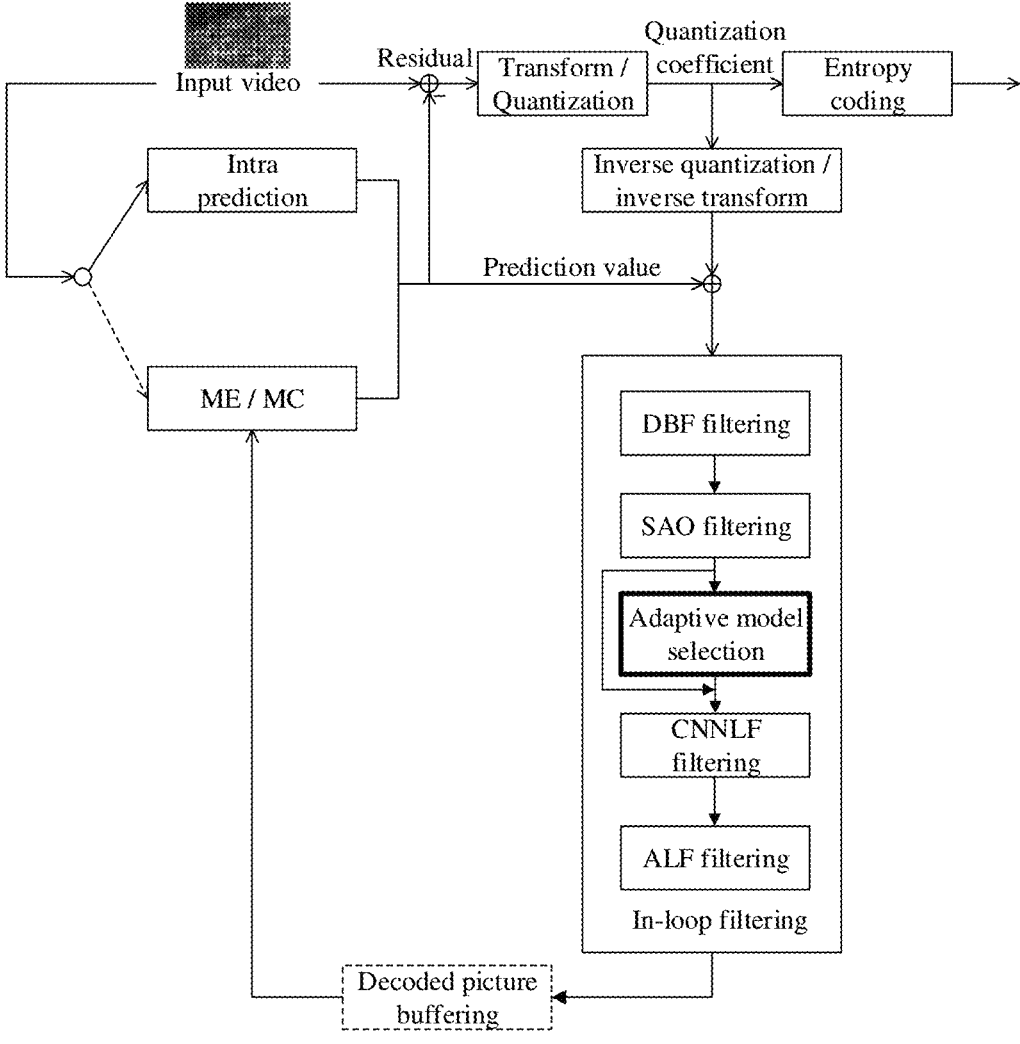

FIG. 5

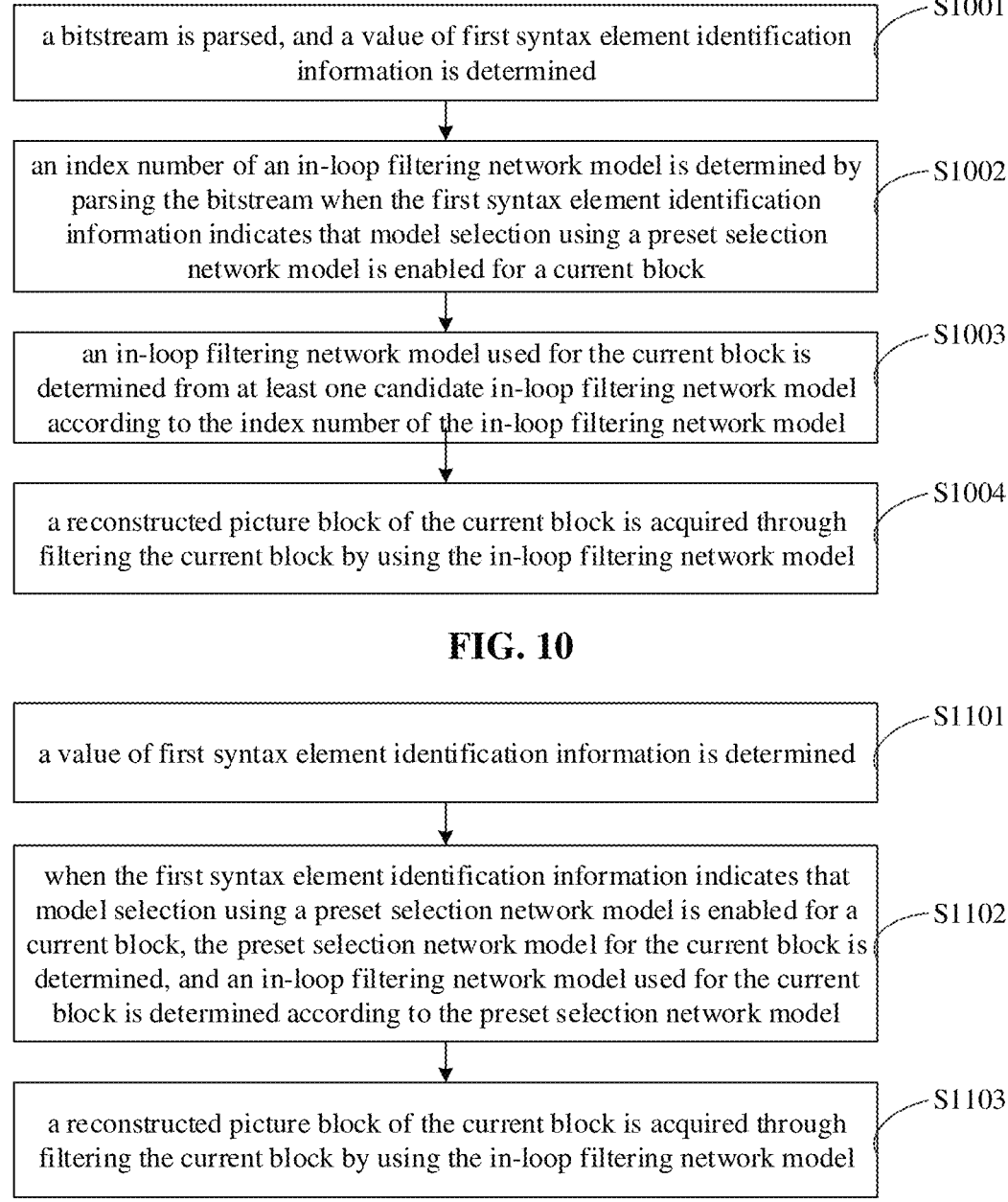

a bitstream is parsed, and a value of first syntax element identification information is determined ⟋ S1001 an index number of an in-loop filtering network model is determined by parsing the bitstream when the first syntax element identification information indicates that model selection using a preset selection network model is enabled for a current block ⟋ S1002 an in-loop filtering network model used for the current block is determined from at least one candidate in-loop filtering network model according to the index number of the in-loop filtering network model ⟋ S1003 a reconstructed picture block of the current block is acquired through filtering the current block by using the in-loop filtering network model ⟋ S1004

FIG. 10 a value of first syntax element identification information is determined ⟋ S1101 when the first syntax element identification information indicates that model selection using a preset selection network model is enabled for a current block, the preset selection network model for the current block is determined, and an in-loop filtering network model used for the current block is determined according to the preset selection network model ⟋ S1102 a reconstructed picture block of the current block is acquired through filtering the current block by using the in-loop filtering network model ⟋ S1103

FIG. 11

ENCODING METHOD, DECODING METHOD, CODE STREAM, ENCODER, DECODER AND STORAGE MEDIUM

CROSS-REFERENCE TO RELATED APPLICATION

This is a continuation application of International Patent Application No. PCT/CN2021/099234, filed on Jun. 9, 2021, entitled "ENCODING METHOD, DECODING METHOD, CODE STREAM, ENCODER, DECODER AND STORAGE MEDIUM", the disclosure of which is hereby incorporated by reference in its entirety.

BACKGROUND

In a video encoding and decoding system, an in-loop filter may be used to improve subjective and objective quality of a reconstructed picture. A conventional in-loop filter mainly includes a deblocking filter (DBF), a sample adaptive offset (SAO) filter, and an adaptive loop filter (ALF). In a high performance-modular artificial intelligence model (HPM-ModAI) of a 3rd audio video coding standard (AVS3), a convolutional neural network based in-loop filter (CNNLF for short hereinafter) may further be used as a baseline solution for an intelligent in-loop filtering module, and set between the SAO filter and the ALF There are some other solutions for selecting a model in related art. However, with most of these solutions, a filtering model with better performance is selected by computing a rate distortion cost of each model. The selection process is highly complex.

SUMMARY

Embodiments of the disclosure relate to the technical field of picture processing, and particularly to an encoding method, a decoding method, a bitstream, an encoder, a decoder, and a storage medium.

A technical solution according to embodiments of the disclosure may be implemented as follows.

In a first aspect, embodiments of the disclosure provide a decoding method, applied to a decoder. The method includes:

parsing a bitstream, and determining a value of first syntax element identification information;

in response to the first syntax element identification information indicating that model selection using a preset selection network model is enabled for a current block, determining the preset selection network model for the current block, and determining an in-loop filtering network model used for the current block according to the preset selection network model; and acquiring a reconstructed picture block of the current block through filtering the current block by using the in-loop filtering network model.

In a second aspect, embodiments of the disclosure provide an encoding method, applied to an encoder. The method includes:

determining a value of first syntax element identification information;

in response to the first syntax element identification information indicating that model selection using a preset selection network model is enabled for a current block, determining the preset selection network model for the current block, and determining an in-loop filtering network model used for the current block according to the preset selection network model; and acquiring a reconstructed picture block of the current block through filtering the current block by using the in-loop filtering network model.

In a third aspect, embodiments of the disclosure provide an encoder. The encoder includes a first memory and a first processor.

The first memory is configured to store thereon a computer program executable for the first processor.

The first processor is configured to implement the encoding method of the second aspect.

In a fourth aspect, embodiments of the disclosure provide a decoder. The decoder includes a second memory and a second processor.

The second memory is configured to store thereon a computer program executable for the second processor.

The second processor is configured to implement the decoding method of any one of the first aspect.

Embodiments of the disclosure provide an encoding method, a decoding method, a bitstream, an encoder, a decoder, and a storage medium. An encoder determines a value of first syntax element identification information. When the first syntax element identification information indicates that model selection using a preset selection network model is enabled for a current block, the encoder determines the preset selection network model for the current block, and determines an in-loop filtering network model used to filter the current block according to the preset selection network model. The encoder acquires a reconstructed picture block of the current block through filtering the current block by using the in-loop filtering network model. A decoder determines a value of first syntax element identification information by parsing a bitstream. When the first syntax element identification information indicates that model selection using a preset selection network model is enabled for a current block, the decoder determines the preset selection network model for the current block, and determines an in-loop filtering network model used to filter the current block according to the preset selection network model. The decoder acquires a reconstructed picture block of the current block through filtering the current block by using the in-loop filtering network model. In this way, model adaptive selection based on deep learning is introduced. An in-loop filtering network model is selected from at least one candidate in-loop filtering network model by using a preset selection network model, and then a current block is filtered according to the selected in-loop filtering network model.

BRIEF DESCRIPTION OF THE DRAWINGS

FIG. 4 is a flowchart of a decoding method according to embodiments of the disclosure.

FIG. 5 is an application diagram of an encoding framework according to embodiments of the disclosure.

FIG. 10 is a flowchart of another decoding method according to embodiments of the disclosure.

FIG. 11 is a flowchart of an encoding method according to embodiments of the disclosure.

DETAILED DESCRIPTION

Figure 1:
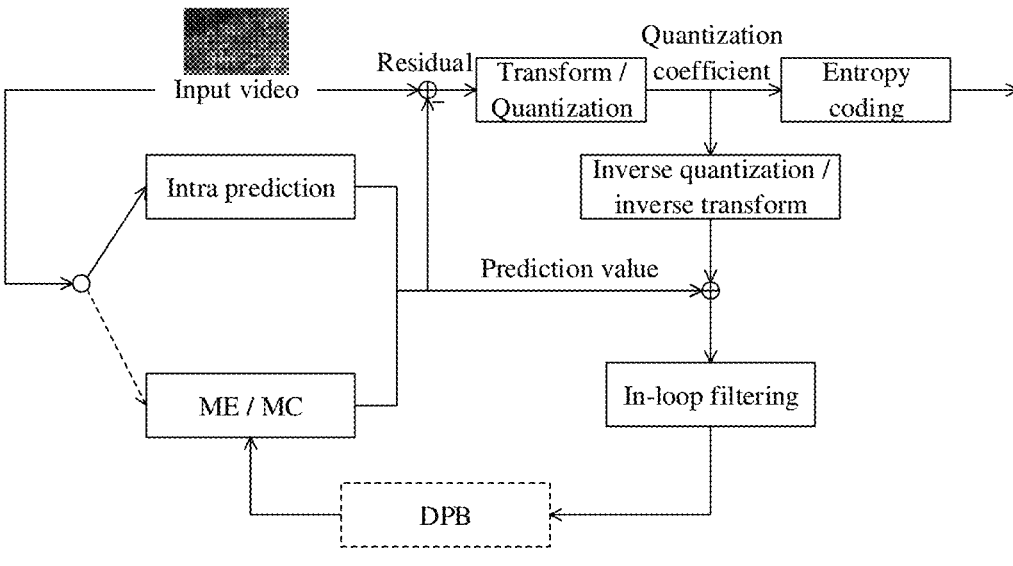
FIG. 1 is an application diagram of an encoding framework in related art.

Embodiments of the disclosure are elaborated hereinafter with reference to the drawings to allow a more thorough understanding of a feature and technical content of an embodiment here. The drawings herein are just for reference and explanation, and are not intended to limit embodiments of the disclosure.

Unless otherwise defined, all technical and scientific terms used herein have the same meanings as commonly understood by a person having ordinary skill in the art of the disclosure. Terms used in the specification of the disclosure are for the mere purpose of describing a specific embodiment, and are not intended to limit the disclosure.

In the following description, "some embodiment(s)" describes a subset of all possible embodiments. However, understandably, "some embodiment(s)" may be the same subset of all possible embodiments or different subsets of all possible embodiments, and may be combined with each other as long as no conflict results from the combination. Also note that in embodiments of the disclosure, a term "first\second\third" is just for differentiating similar objects, and does not denote any specific order of the objects. Understandably, when allowed, "first\second\third" in a specific order is interchangeable, to allow embodiments of the disclosure described here to be implemented in an order other than one illustrated or described here.

In a video picture, a coding block (CB) is denoted generally by a first colour component, a second colour component, and a third colour component. The three colour components may be a luma component, a blue chroma component, and a red chroma component, respectively. Specifically, the luma component is denoted in general by Y. The blue chroma component may be denoted in general by Cb or U. The red chroma component may be denoted in general by Cr or V. Thus, the video picture may be expressed in a YCbCr format or a YUV format.

Before embodiments of the disclosure is elaborated further, described and explained are names and terms involved in embodiments of the disclosure, as follows:

joint video experts team (JVET), next generation video coding standard H.266/versatile video coding (VVC), VVC reference software test platform (VVC test model, VTM), audio video coding standard (AVS), AVS high-performance test model (high-performance model, HPM), AVS high performance-modular artificial intelligence model (HPM-ModAI), convolutional neural network based in-loop filter (CNNLF), deblocking filter (DBF), sample adaptive offset (SAO), adaptive loop filter (ALF), quantization parameter (QP), coding unit (CU), and coding tree unit (CTU).

Understandably, digital video compression mainly involves compressing a huge amount of digital image video data to facilitate transmission and storage, etc. With a soaring number of internet videos and an increasingly high requirement on video clarity, although a lot of video data may be saved with an existing digital video compression standard, better digital video compression is yet to be achieved to reduce pressure on a bandwidth and a traffic of digital video transmission.

In digital video coding, for original video sequences of different colour formats, an encoder may read unequal pixels including luma components and chroma components. That is, the encoder may read a black and white picture or a colour picture. Then, the picture may be partitioned into blocks. Block data may be encoded by the encoder. At present, an encoder in general uses a hybrid-framework coding mode, and the mode generally includes operations such as intra prediction and inter prediction, transform/quantization, inverse quantization/inverse transform, in-loop filtering, entropy coding, etc. A specific processing flow may be as illustrated in FIG. 1. Here, in intra prediction, pixel information in a current partition block is predicted by referring just to information from one picture, to eliminate space redundancy. Inter prediction may include motion estimation (ME) and motion compensation (MC). In inter prediction, search may be performed for motion vector information best matching the current partition block using motion estimation by referring to information from different pictures, to eliminate time redundancy. In transform, a predicted picture block may be converted into a frequency domain, redistributing energy. Combining transform and quantization, information insensible to human eye may be removed to eliminate visual redundancy. In entropy coding, character redundancy may be eliminated according to probability information in a binary bitstream and a current context model. In-loop filtering then mainly processes a pixel having gone through inverse transform and inverse quantization to make up for distorted information, providing a better reference for subsequently coding the pixel.

Figure 2:
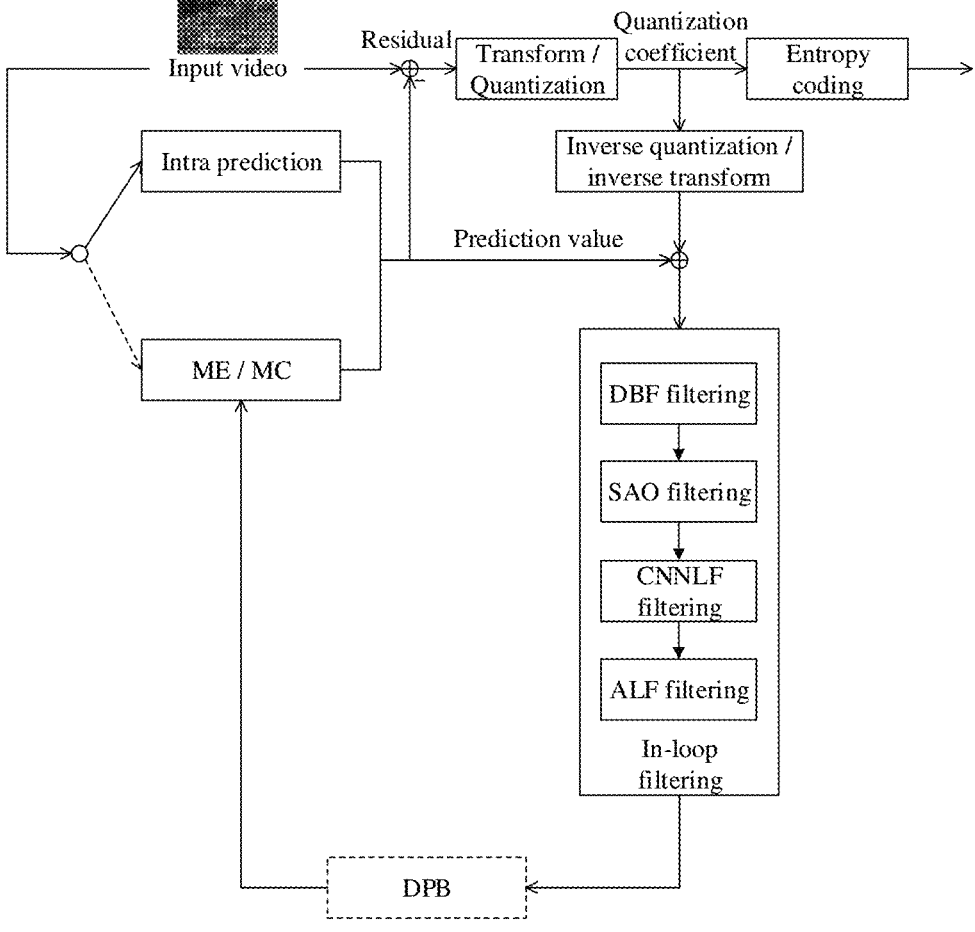
FIG. 2 is an application diagram of another encoding framework in related art.

In a possible implementation, for the in-loop filtering part, a conventional in-loop filtering module mainly includes a deblocking filter (DBF for short hereinafter), a sample adaptive offset filter (SAO for short hereinafter), and an adaptive loop filter (ALF for short hereinafter). In an HPM-ModAI application, a convolutional neural network based in-loop filter (CNNLF for short hereinafter) may further be used as a baseline solution for an intelligent in-loop filtering module, and set between the SAO filter and the ALF, specifically as illustrated in FIG. 2. In a coding test, according to a universal intelligent coding test condition, for an all intra configuration, the ALF may be enabled, and the DBF and the SAO may be disabled. For a random access and low delay configuration, the DBF may be enabled for an intra-frame (I-frame), the ALF may be enabled, and the SAO may be disabled.

Specifically, in an HPM-ModAI, a total of 16 distinct CNNLF models, including 4 I-frame luma component models, 4 non-I-frame luma component models, 4 chroma U component models, and 4 chroma V component models, may be trained respectively according to 4 QP partition ranges 27-31, 32-37, 38-44, and 45-50. Coding may be performed using a model selected from the 16 CNNLF models that corresponds to distinct colour component and QP. For a configuration such as random access, low delay, etc., a certain fluctuation in a QP of a picture may be produced by coding compared to an initial QP, such that the selected CNNLF model does not necessarily produce the best result for filtering the picture.

In addition, in some existing technical solutions, model selection based neural network in-loop filter solutions are explored based respectively on an AVS reference software test platform HPM or a VTM. However, in most model selecting modes in these technical solutions, a model with better performance may be selected by computing a rate distortion cost of a CNNLF model at an encoder side, which is highly complex. That is, with an existing technical solution, a model with better performance cannot be selected adaptively from multiple CNNLF models to filter a distinct CU.

Embodiments of the disclosure provide an encoding method. An encoder determines a value of first syntax element identification information. When the first syntax element identification information indicates that model selection using a preset selection network model is enabled for a current block, the encoder determines the preset selection network model for the current block, and determines an in-loop filtering network model used to filter the current block according to the preset selection network model. The encoder acquires a reconstructed picture block of the current block through filtering the current block by using the in-loop filtering network model.

Embodiments of the disclosure further provide a decoding method. A decoder parses a bitstream and determines a value of first syntax element identification information. When the first syntax element identification information indicates that model selection using a preset selection network model is enabled for a current block, the decoder determines the preset selection network model for the current block, and determines an in-loop filtering network model used to filter the current block according to the preset selection network model. The decoder acquires a reconstructed picture block of the current block through filtering the current block by using the in-loop filtering network model.

In this way, model adaptive selection based on deep learning is introduced, where an in-loop filtering network model is selected from at least one candidate in-loop filter-ing network model using a preset selection network model, and then a current block is filtered according to the selected in-loop filtering network model, not only improving coding performance, thereby improving encoding and decoding efficiencies, but also leading to a final output reconstructed picture block closer to an original picture block, improving quality of a video picture.

Embodiments of the disclosure are elaborated hereinafter with reference to the drawings.

Figure 3A:
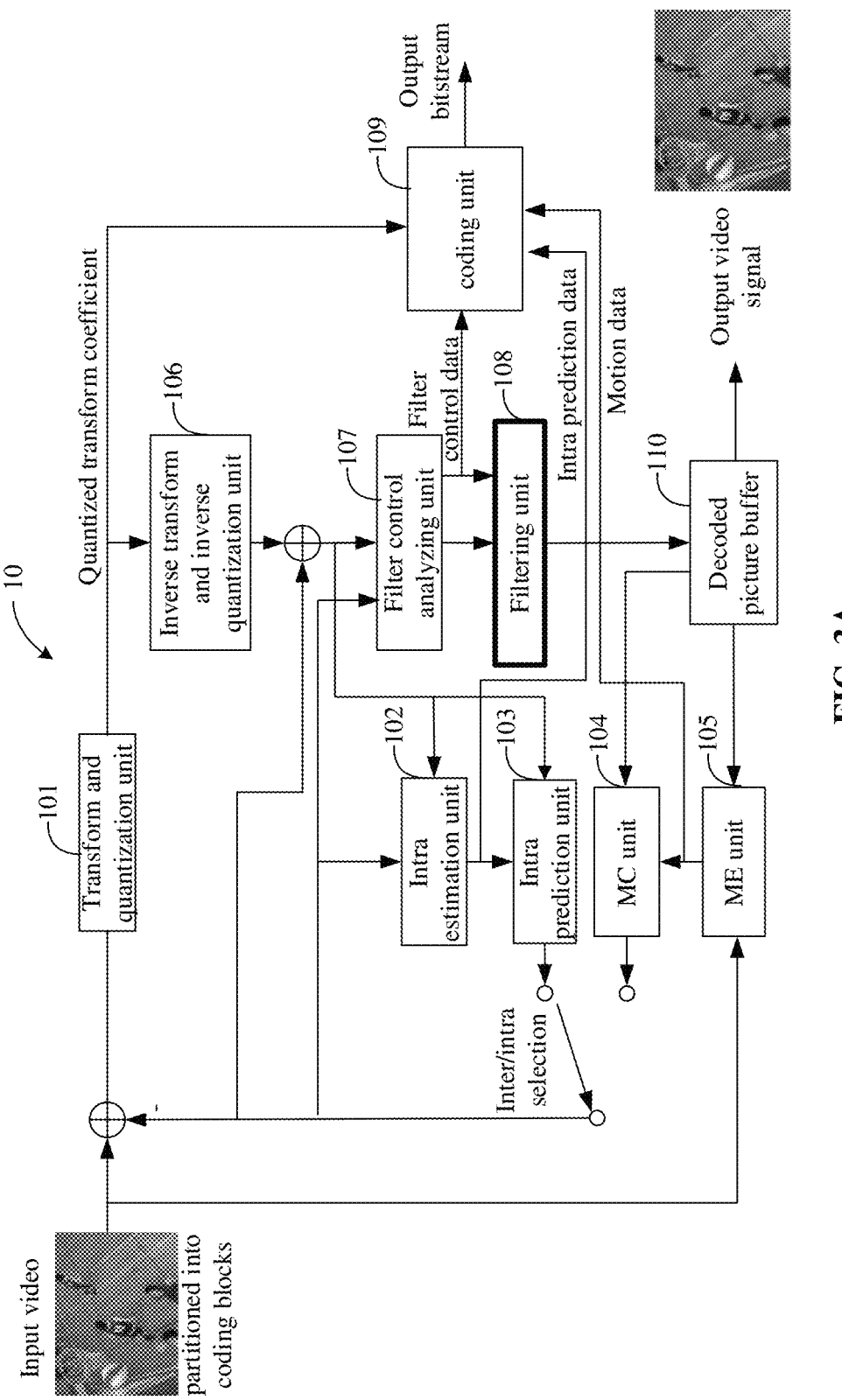
FIG. 3A is a diagram of a detailed framework of a video encoding system according to embodiments of the disclosure.

FIG. 3A is a diagram of a detailed framework of a video encoding system according to embodiments of the disclosure. As illustrated in FIG. 3A, the video encoding system 10 may include a transform and quantization unit 101, an intra estimation unit 102, an intra prediction unit 103, a motion compensation (MC) unit 104, a motion estimation (ME) unit 105, an inverse transform and inverse quantization unit 106, a filter control analyzing unit 107, a filtering unit 108, an encoding unit 109, a decoded picture buffer (DPB) 110, etc. The filtering unit 108 may implement DBF filtering/SAO filtering/ALF filtering. The encoding unit 109 may implement header information coding and context-based adaptive binary arithmetic coding (CABAC). For an input original video signal, a video CB may be acquired through coding tree unit (CTU) partitioning. Then, residual pixel information of the video CB acquired through intra prediction or inter prediction may be transformed using the transform and quantization unit 101. The transform may include transforming residual information in a pixel domain into residual information in a transform domain, and quantizing an acquired transform coefficient to further reduce a bit rate. The intra estimation unit 102 and the intra prediction unit 103 may be configured to perform intra prediction on the video CB. Specifically, the intra estimation unit 102 and the intra prediction unit 103 may be configured to determine an intra prediction mode to be used to encode the video CB. The MC unit 104 and the ME unit 105 may be configured to perform inter prediction coding on a received video CB with respect to one or more blocks in one or more reference pictures to provide time prediction information. Motion estimation performed by the ME unit 105 may produce a motion vector. Motion of the video CB may be estimated using the motion vector. Then, the MC unit 104 may perform motion compensation based on the motion vector determined by the ME unit 105. After the intra prediction mode has been determined, the intra prediction unit 103 may further be configured to provide selected intra prediction data to the encoding unit 109. The ME unit 105 may also send computed motion vector data to the encoding unit 109. In addition, the inverse transform and inverse quantization unit 106 may be configured to reconstruct the video CB, reconstructing a residual block in the pixel domain. The reconstructed residual block may go through the filter control analyzing unit 107 and the filtering unit 108 to remove a blocking artifact. Then, the reconstructed residual block may be added to a predictive block in a picture of the decoded picture buffer 110, to produce a reconstructed video CB. The encoding unit 109 may be configured to encode various coding parameters and quantized transform coefficients. In a coding algorithm based on CABAC, context content may be based on a neighbouring CB, and may be configured to encode information indicating the determined intra prediction mode and output a bitstream of the video signal. The decoded picture buffer 110 may be configured to store the reconstructed video CB as a prediction reference. As video picture coding progresses, new reconstructed video CBs may be generated continuously, these reconstructed video CBs may all be stored in the decoded picture buffer 110.

Figure 3B:
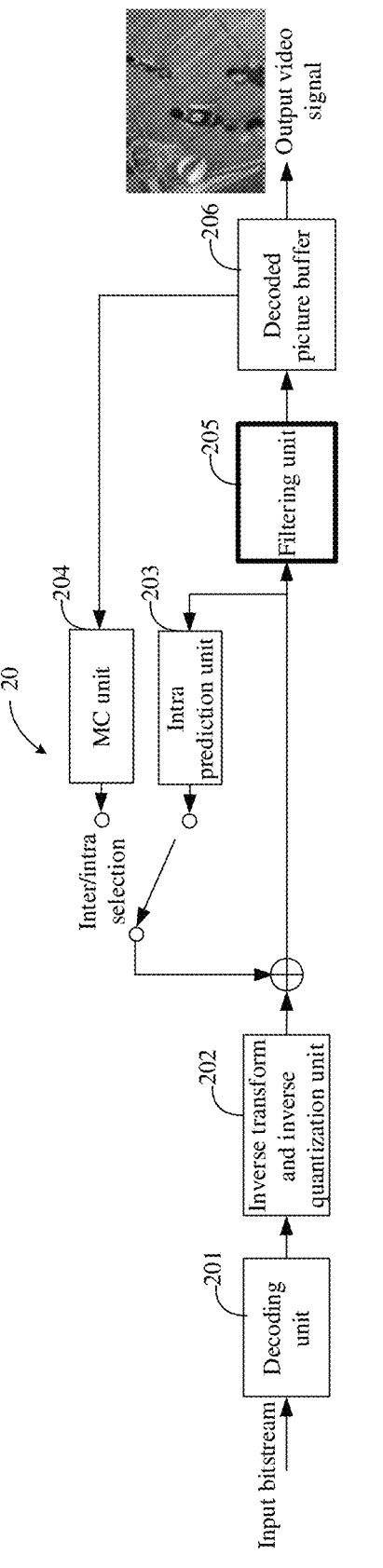
FIG. 3B is a diagram of a detailed framework of a video decoding system according to embodiments of the disclosure.

FIG. 3B is a diagram of a detailed framework of a video decoding system according to embodiments of the disclosure. As illustrated in FIG. 3B, the video decoding system 20 may include a decoding unit 201, an inverse transform and inverse quantization unit 202, an intra prediction unit 203, an MC unit 204, a filtering unit 205, a decoded picture buffer 206, etc. The decoding unit 201 may implement header information decoding and CABAC decoding. The filtering unit 205 may implement DBF filtering/SAO filtering/ALF filtering. After the input video signal has gone through coding processing of FIG. 3A, the bitstream of the video signal may be output. The bitstream may be input to the video decoding system 20, and first go through the decoding unit 201 to acquire a decoded transform coefficient. The transform coefficient may be processed by the inverse transform and inverse quantization unit 202, to produce a residual block in the pixel domain. The intra prediction unit 203 may be configured to produce predicted data of a current video CB based on the determined intra prediction mode and data of a decoded block from a current picture or picture. The MC unit 204 may determine prediction information configured for a video CB by analyzing a motion vector and another associated syntax element, and produce a predictive block of the video CB being decoded using the prediction information. The residual block from the inverse transform and inverse quantization unit 202 and a corresponding predictive block produced by the intra prediction unit 203 or the MC unit 204 may be summed to form a decoded video block. The decoded video signal may go through the filtering unit 205 to remove a blocking artifact, improving video quality. Then, the decoded video block may be stored in the decoded picture buffer 206. The decoded picture buffer 206 may store a reference picture configured for subsequent intra prediction or motion compensation, and may also be configured to output the video signal, thus recovering the original video signal.

Note that a method according to embodiments of the disclosure may apply to the filtering unit 108 (denoted by a black bold box) as illustrated in FIG. 3A, as well as the filtering unit 205 (denoted by a black bold box) as illustrated in FIG. 3B. That is, a method according to embodiments of the disclosure may be implemented by the video encoding system (encoder for short) or by the video decoding system (decoder for short), or even be implemented by both the video encoding system and the video decoding system, which is not limited in any way.

Further note that when an embodiment of the disclosure is implemented by the encoder, a current block specifically refers to a block to be encoded currently (coding block for short) in a video picture. When an embodiment of the disclosure is implemented by the decoder, a current block specifically refers to a block to be decoded currently (coding block for short) in a video picture.

In an embodiment of the disclosure, FIG. 4 is a flowchart of a decoding method according to embodiments of the disclosure. As illustrated in FIG. 4, the method includes operations as follows.

At S401, a bitstream is parsed, and a value of first syntax element identification information is determined.

Note that a video picture may be partitioned into multiple picture blocks. Each picture block to be decoded currently may be referred to as a coding block. Here, each coding block may include a first colour component, a second colour component, and a third colour component. A current block may be a coding block in the video picture, the first colour component, the second colour component, or the third colour component of which is currently to go through in-loop filtering.

Here, in embodiments of the disclosure, the first colour component, the second colour component, and the third colour component may be divided into two types of colour components, i.e., a luma component and a chroma component. In this case, if an operation such as prediction, inverse transform and inverse quantization, in-loop filtering, etc., is to be performed on the luma component of the current block, then the current block may also be referred to as a luma block. Alternatively, if an operation such as prediction, inverse transform and inverse quantization, in-loop filtering, etc., is to be performed on the chroma component of the current block, then the current block may also be referred to as a chroma block.

Further note that at the decoder side, embodiments of the disclosure specifically provide an in-loop filtering method, particularly a method for model adaptive selection based on deep learning. The method may apply to the filtering unit 205 as illustrated in FIG. 3B. Here, the filtering unit 205 may include a DBF, a SAO filter, a CNNLF, and an ALF. A method according to embodiments of the disclosure is specifically implemented between the SAO and the CNNLF to adaptively select a CNNLF model. Then, a suitable model may be selected to perform CNNLF filtering.

More specifically, embodiments of the disclosure propose a model adaptive selection (MAS) module based on deep learning, configured to adaptively select an in-loop filtering network model (such as a CNNLF model) to improve coding performance. As illustrated in FIG. 5, the in-loop filter includes the DBF, the SAO. In addition, the in-loop filter may further include a MAS module. The MAS module may be located between the SAO filtering and the CNNLF filtering. In addition, use of the MAS module does not depend on any switch of the DBF, the SAO, the CNNLF, and the ALF. It is just that the MAS module is located before the CNNLF. Note that the MAS module may be deemed as a preset selection network model consisting of multiple CNN layers and multiple fully connected neural network layers. A suitable model may be selected using the preset selection network model to perform CNNLF filtering.

Here, the first syntax element identification information may be set. Then, the decoder may determine whether model selection using a preset selection network model is enabled for a current block according to the value of the first syntax element identification information acquired by decoding. In some embodiments, the method may further include an operation as follows.

If the value of the first syntax element identification information is a first value, it may be determined that the first syntax element identification information indicates that model selection using the preset selection network model is enabled for the current block.

Alternatively, if the value of the first syntax element identification information is a second value, it may be determined that the first syntax element identification information indicates that model selection using the preset selection network model is disabled for the current block.

Note that the first value and the second value differ. The first value and the second value may be parametric. The first value and the second value may be digital. Specifically, the first syntax element identification information may be a parameter signalled in a profile, or may be the value of a flag, which is not limited in any way in embodiments of the disclosure.

For example, the first syntax element identification information is a flag. In this case, the first value may be set as 1, and the second value may be set as 0. Alternatively, the first value may be set as true, and the second value may be set as false. Alternatively, the first value may be set as 0, and the second value may be set as 1. Alternatively, the first value may be set as false, and the second value may be set as true. Illustratively, for a flag, in general, the first value may be 1, and the second value may be 0, which however is not limited in any way.

Further note that the preset selection network model may be deemed as a neural network, and the first syntax element identification information may be deemed as an enabling flag for a neural network based model adaptive selection, which may be denoted here by model_adaptive_selection_enable_flag. Specifically, model_adaptive_selection_enable_flag may be configured to indicate whether model selection using the preset selection network model is enabled for the current block.

Understandably, as a model is selected from multiple candidate in-loop filtering network models by using the preset selection network model, before determining whether model selection using a preset selection network model is enabled for the current block, it needs to be determined whether the current block is filtered by using an in-loop filtering network model. Thus, model selection may be performed by using the preset selection network model if the current block is filtered by using an in-loop filtering network model. Otherwise, model selection using the preset selection network model is not required if the current block is not filtered by using an in-loop filtering network model.

In embodiments of the disclosure, first, a sequence header identification may be set to indicate whether the current block is filtered by using an in-loop filtering network model. For example, the second syntax element identification information may be set to indicate whether a current video sequence is filtered by using an in-loop filtering network model.

In some embodiments, the method may further include an operation as follows. A value of second syntax element identification information may be determined by parsing the bitstream. The second syntax element identification information may indicate whether a video sequence is filtered by using an in-loop filtering network model.

In some embodiments, the method may further include an operation as follows.

If the value of the second syntax element identification information is a first value, it may be determined that the second syntax element identification information indicates that the video sequence is filtered by using an in-loop filtering network model.

Alternatively, if the value of the second syntax element identification information is a second value, it may be determined that the second syntax element identification information indicates that the video sequence is not filtered by using an in-loop filtering network model.

Note that the first value and the second value differ.

In embodiments of the disclosure, for example, the second syntax element identification information is flag information. In this case, the first value may be set as 1, and the second value may be set as 0. Alternatively, the first value may be set as true, and the second value may be set as false. Alternatively, the first value may be set as 0, and the second value may be set as 1. Alternatively, the first value may be set as false, and the second value may be set as true, which is not limited in any way in embodiments of the disclosure.

Further note that the video sequence may include at least one picture. The at least one picture may include a current picture. Here, when it is determined that the video sequence is filtered by using an in-loop filtering network model, in embodiments of the disclosure, it further has to be determined whether the current picture in the video sequence is filtered by using an in-loop filtering network model. That is, the third syntax element identification information further has to be set.

That is, in some embodiments, the method may further include an operation as follows. A value of third syntax element identification information may be determined by parsing the bitstream. The third syntax element identification information may indicate whether the current picture in the video sequence is filtered by using an in-loop filtering network model.

In a specific example, to determine whether the current block is filtered by using an in-loop filtering network model, the method may further include operations as follows.

The value of the second syntax element identification information may be determined by parsing the bitstream.

When the second syntax element identification information indicates that the video sequence is filtered by using an in-loop filtering network model, a value of third syntax element identification information may be determined by parsing the bitstream.

Note that for a luma component and a chroma component, the third syntax element identification information may have different meanings, and an in-loop filtering network model may also differ. In embodiments of the disclosure, an in-loop filtering network model corresponding to a luma component may be referred to as a luma in-loop filtering network model. An in-loop filtering network model corresponding to a chroma component may be referred to as a chroma in-loop filtering network model. Therefore, in some embodiments, the value of the third syntax element identification information may be determined by parsing the bitstream as follows.

First luma syntax element identification information corresponding to a luma component of the current picture may be acquired by parsing the bitstream. The first luma syntax element identification information may indicate whether the luma component of the current picture is filtered by using a luma in-loop filtering network model.

Alternatively, Chroma syntax element identification information corresponding to a chroma component of the current picture may be acquired by parsing the bitstream. The chroma syntax element identification information may indicate whether the chroma component of the current picture is filtered by using a chroma in-loop filtering network model.

In embodiments of the disclosure, for the luma component of the current picture, the third syntax element identification information may be referred to as the first luma syntax element identification information, configured to indicate whether the luma component of the current picture is filtered by using an in-loop filtering network model. For the chroma component of the current picture, the third syntax element identification information may be referred to as the chroma syntax element identification information, configured to indicate whether the chroma component of the current picture is filtered by using a chroma in-loop filtering network model.

Note that the current picture may be partitioned into at least one block. The at least one block may include the current block. In embodiments of the disclosure, filtering the current picture using an in-loop filtering network model does not mean filtering each block in the current picture using an in-loop filtering network model. The CTU-level syntax element identification information may further be involved to further determine whether the current block is filtered by using an in-loop filtering network model. Description is made hereinafter respectively taking the luma component and the chroma component as examples.

In a possible implementation, for the luma component of the current picture, the value of the first syntax element identification information may be determined by parsing the bitstream as follows.

If the first luma syntax element identification information indicates that the luma component of the current picture is filtered by using a luma in-loop filtering network model, a value of second luma syntax element identification information may be determined by parsing the bitstream.

If the second luma syntax element identification information indicates that a luma component of the current block is filtered by using a luma in-loop filtering network model, the value of the first syntax element identification information may be determined by parsing the bitstream.

Note that for the luma component, two syntax elements may be involved here, i.e., a picture-level syntax element and a CTU-level syntax element. The picture-level syntax element may be referred to as the first luma syntax element identification information, denoted by luma_picture_flag. The CTU-level syntax element may be referred to as the second luma syntax element identification information, denoted by luma_ctu_flag.

Further note that for the luma component, in embodiments of the disclosure, a luma picture-level switch and a luma CTU-level switch may further be set. It may be determined whether filtering is performed using a luma in-loop filtering network model by controlling whether to enable any in-loop filtering network model for the luma component. Therefore, in some embodiments, the method may further include an operation as follows. A luma picture-level switch and a luma CTU-level switch may be set. The current block may be located in the current picture. The luma picture-level switch may be configured to control whether the luma component of the current picture is filtered by using a luma in-loop filtering network model. The luma CTU-level switch may be configured to control whether the luma component of the current block is filtered by using a luma in-loop filtering network model.

Further, for the first luma syntax element identification information, in some embodiments, the method may further include an operation as follows.

If the value of the first luma syntax element identification information is the first value, it may be determined that the first luma syntax element identification information indicates that the luma component of the current picture is filtered by using a luma in-loop filtering network model.

Alternatively, if the value of the first luma syntax element identification information is the second value, it may be determined that the first luma syntax element identification information indicates that the luma component of the current picture is not filtered by using a luma in-loop filtering network model.

In some embodiments, the method may further include an operation as follows.

If the value of the first luma syntax element identification information is the first value, the luma picture-level switch may be turned on.

Alternatively, if the value of the first luma syntax element identification information is the second value, the luma picture-level switch may be turned off.

Note that the first value and the second value differ. The first value and the second value may be parametric. The first value and the second value may be digital. Specifically, the value of the first luma syntax element identification information may be a parameter signalled in a profile, and may also be the value of a flag, which is not limited in any way in embodiments of the disclosure.

In embodiments of the disclosure, for example, the first luma syntax element identification information is flag information. In this case, the first value may be set as 1, and the second value may be set as 0. Alternatively, the first value may be set as true, and the second value may be set as false. Alternatively, the first value may be set as 0, and the second value may be set as 1. Alternatively, the first value may be set as false, and the second value may be set as true, which is not limited in any way in embodiments of the disclosure.

For example, the first value is 1, and the second value is 0. If the value of the first luma syntax element identification information acquired via decoding is 1, the luma picture-level switch may be turned on. That is, a picture-level in-loop filtering network model is called, in which case it may be determined that the luma component of the current picture is filtered by using a luma in-loop filtering network model. Otherwise if the value of the first luma syntax element identification information is 0, the luma picture-level switch may be turned off. That is, a picture-level in-loop filtering network model is not called, in which case it may be determined that the luma component of the current picture is not filtered by using a luma in-loop filtering network model. In this case, a next picture may be acquired from the video sequence. The next picture may be taken as the current picture. Then, the flow may continue at the operation of determining the value of the first luma syntax element identification information by parsing the bitstream.

Further, for the second luma syntax element identification information, in some embodiments, the method may further include an operation as follows.

If the value of the second luma syntax element identification information is the first value, it may be determined that the second luma syntax element identification information indicates that the luma component of the current block is filtered by using a luma in-loop filtering network model.

Alternatively, if the value of the second luma syntax element identification information is the second value, it may be determined that the second luma syntax element identification information indicates that the luma component of the current block is not filtered by using a luma in-loop filtering network model.

In some embodiments, the method may further include an operation as follows.

If the value of the second luma syntax element identification information is the first value, the luma CTU-level switch may be turned on.

Alternatively, if the value of the second luma syntax element identification information is the second value, the luma CTU-level switch may be turned off.

Note that the first value and the second value differ.

In embodiments of the disclosure, for example, the second luma syntax element identification information is another piece of flag information. In this case, the first value may be set as 1, and the second value may be set as 0. Alternatively, the first value may be set as true, and the second value may be set as false. Alternatively, the first value may be set as 0, and the second value may be set as 1. Alternatively, the first value may be set as false, and the second value may be set as true, which is not limited in any way in embodiments of the disclosure.

For example, the first value is 1, and the second value is 0. In case the value of the first luma syntax element identification information acquired via decoding is 1, if the value of the second luma syntax element identification information is 1, the luma CTU-level switch may be turned on. That is, a CTU-level in-loop filtering network model is called, in which case it may be determined that the luma component of the current block is filtered by using a luma in-loop filtering network model. Otherwise if the value of the second luma syntax element identification information is 0, the luma CTU-level switch may be turned off. That is, a CTU-level in-loop filtering network model is not called, in which case it may be determined that the luma component of the current block is not filtered by using a luma in-loop filtering network model. In this case, a next block may be acquired from the current picture. The next block may be taken as the current block. Then, the flow may continue at the operation of determining the value of the second luma syntax element identification information by parsing the bitstream, until each block included in the current picture is processed. Then, the flow may continue at loading and processing the next picture.

In another possible implementation, for the chroma component of the current picture, the value of the first syntax element identification information may be determined by parsing the bitstream as follows.

If the chroma syntax element identification information indicates that the chroma component of the current picture is filtered by using a chroma in-loop filtering network model, the value of the first syntax element identification information may be determined by parsing the bitstream.

Note that a picture-level syntax element may be involved for the chroma component. The picture-level syntax element may be referred to as the chroma syntax element identification information, denoted by chroma_picture_flag.

Further note that given coding performance and computational complexity, if the chroma syntax element identification information indicates that the chroma component of the current picture is filtered by using a chroma in-loop filtering network model, then by default each block included in the current picture is filtered by using a chroma in-loop filtering network model. If the chroma syntax element identification information indicates that the chroma component of the current picture is not filtered by using a chroma in-loop filtering network model, then by default each block included in the current picture is not filtered by using a chroma in-loop filtering network model. Therefore, no CTU-level syntax element has to be set for the chroma component. Similarly, no CTU-level switch has to be set for the chroma component. In other words, in embodiments of the disclosure, just a picture-level switch may be set for the chroma component. Therefore, in some embodiments, the method may further include an operation of setting a chroma picture-level switch. The chroma picture-level switch may be configured to control whether the chroma component of the current picture is filtered by using a chroma in-loop filtering network model.

Further, for the chroma syntax element identification information, in some embodiments, the method may further include an operation as follows.

If the value of the chroma syntax element identification information is the first value, it may be determined that the chroma syntax element identification information indicates that the chroma component of the current picture is filtered by using a chroma in-loop filtering network model.

Alternatively, if the value of the chroma syntax element identification information is the second value, it may be determined that the chroma syntax element identification information indicates that the chroma component of the current picture is not filtered by using a chroma in-loop filtering network model.

In some embodiments, the method may further include an operation as follows.

If the value of the chroma syntax element identification information is the first value, the chroma picture-level switch may be turned on.

Alternatively, if the value of the chroma syntax element identification information is the second value, the chroma picture-level switch may be turned off.

Note that the first value and the second value differ. The first value and the second value may be parametric. The first value and the second value may be digital. Specifically, each of the chroma syntax element identification information and the chroma picture-level switch may be a parameter signalled in a profile, and may also be the value of a flag, which is not limited in any way in embodiments of the disclosure.

In embodiments of the disclosure, for example, the chroma syntax element identification information is yet another piece of flag information. In this case, the first value may be set as 1, and the second value may be set as 0. Alternatively, the first value may be set as true, and the second value may be set as false. Alternatively, the first value may be set as 0, and the second value may be set as 1. Alternatively, the first value may be set as false, and the second value may be set as true, which is not limited in any way in embodiments of the disclosure.

For example, the first value is 1, and the second value is 0. If the value of the chroma syntax element identification information acquired via decoding is 1, the chroma picture-level switch may be turned on. That is, a picture-level in-loop filtering network model is called, in which case it may be determined that the chroma component of the current picture is filtered by using a chroma in-loop filtering network model, and by default each block corresponding to the chroma component of the current picture is filtered by using a chroma in-loop filtering network model. Otherwise if the value of the chroma syntax element identification information is 0, the chroma picture-level switch may be turned off. That is, a picture-level in-loop filtering network model is not called, in which case it may be determined that each block corresponding to the chroma component of the current picture is not filtered by using a chroma in-loop filtering network model. In this case, a next picture may be acquired from the video sequence. The next picture may be taken as the current picture. Then, the flow may continue at the operation of determining the value of the chroma syntax element identification information by parsing the bitstream.

Further note that the syntax element identification information may be set for each of the luma component and the chroma component of a video sequence, a current picture, a current block, etc., to determine whether the video sequence, the current picture, the current block, etc., is filtered by using an in-loop filtering network model. Then, information indicated by the syntax element identification information may be determined by parsing the bitstream. Alternatively, the syntax element identification information may be set for just the current block and/or the current picture. Then, information indicated by the syntax element identification information may be determined by parsing the bitstream. In embodiments of the disclosure, a syntax element identification information (such as the second syntax element identification information, the first luma syntax element identification information, the second luma syntax element identification information, and the chroma syntax element identification information, etc.) may be set for each of the video sequence, the current picture, and the current block, which however is not specifically limited here.

Thus, having acquired the value of the first luma syntax element identification information, the value of the second luma syntax element identification information, and the value of the chroma syntax element identification information by parsing the bitstream, the decoder may determine whether the current block is filtered by using an in-loop filtering network model (including a luma in-loop filtering network model or a chroma in-loop filtering network model). In case the current block is filtered by using an in-loop filtering network model, the value of the first syntax element identification information may be acquired by further parsing the bitstream, thereby determining whether model selection using the preset selection network model is enabled for the current block.

At S402, when the first syntax element identification information indicates that model selection using a preset selection network model is enabled for a current block, the preset selection network model for the current block is determined. An in-loop filtering network model used for the current block is determined according to the preset selection network model.

Note that if model selection using a preset selection network model is enabled for the current block, then after the preset selection network model for the current block has been determined, the in-loop filtering network model used to filter the current block is determined according to the preset selection network model.

In some embodiments, the in-loop filtering network model used to filter the current block may be determined according to the preset selection network model as follows.

An output value corresponding to each candidate in-loop filtering network model of at least one candidate in-loop filtering network model may be determined according to the preset selection network model.

The in-loop filtering network model used to filter the current block may be determined according to the output value corresponding to each of the at least one candidate in-loop filtering network model.

Further, in some embodiments, the in-loop filtering network model used to filter the current block may be determined according to the output value corresponding to each of the at least one candidate in-loop filtering network model as follows.

A target value may be determined from the output value corresponding to each of the at least one candidate in-loop filtering network model. A candidate in-loop filtering network model corresponding to the target value may be taken as the in-loop filtering network model used to filter the current block.

In a specific example, the target value may be determined from the output value corresponding to each of the at least one candidate in-loop filtering network model as follows. A maximum value of the output value corresponding to each of the at least one candidate in-loop filtering network model may be selected. The maximum value may be taken as the target value.

That is, an output value corresponding to each candidate in-loop filtering network model of at least one candidate in-loop filtering network model may be determined according to the preset selection network model. A target value (such as the maximum value) of the output value corresponding to each of the at least one candidate in-loop filtering network model may be determined. A candidate in-loop filtering network model corresponding to the target value (such as the maximum value) may be taken as the in-loop filtering network model used to filter the current block.

Further note that the output value may be a probability value. Specifically, the output value corresponding to each of the at least one candidate in-loop filtering network model may be configured to reflect a probability distribution of each of the at least one candidate in-loop filtering network model.

Further note that a preset selection network model may differ for different types of colour components. In embodiments of the disclosure, a preset selection network model corresponding to the luma component may be referred to as a luma selection network model. A preset selection network model corresponding to the chroma component may be referred to as a chroma selection network model. Therefore, in some embodiments, the preset selection network model for the current block may be determined as follows.

A luma selection network model for the current block may be determined if a colour component type of the current block is a luma component.

A chroma selection network model for the current block may be determined if the colour component type of the current block is a chroma component.

Accordingly, a candidate in-loop filtering network model may also differ for different types of colour components. In embodiments of the disclosure, a candidate in-loop filtering network model corresponding to the luma component may be referred to as a candidate luma in-loop filtering network model. A candidate in-loop filtering network model corresponding to the chroma component may be referred to as a candidate chroma in-loop filtering network model. Therefore, in some embodiments, the output value corresponding to each of the at least one candidate in-loop filtering network model may be determined according to the preset selection network model as follows.

If the colour component type of the current block is the luma component, an output value corresponding to each candidate luma in-loop filtering network model of at least one candidate luma in-loop filtering network model may be determined according to the luma selection network model.

If the colour component type of the current block is the chroma component, an output value corresponding to each candidate chroma in-loop filtering network model of at least one candidate chroma in-loop filtering network model may be determined according to the chroma selection network model.

That is, there may be two types of colour components, i.e., the luma component and the chroma component. In embodiments of the disclosure, a current block may be referred to as a luma block if the colour component type of the current block is the luma component, in which case a luma selection network model for the current block is to be determined. Then, an output value corresponding to each candidate luma in-loop filtering network model of at least one candidate luma in-loop filtering network model is to be determined according to the luma selection network model. A current block may be referred to as a chroma block if the colour component type of the current block is the chroma component, in which case a chroma selection network model for the current block is to be determined. Then, an output value corresponding to each candidate chroma in-loop filtering network model of at least one candidate chroma in-loop filtering network model is to be determined according to the chroma selection network model.

Further note that a candidate in-loop filtering network model, regardless if it is at least one candidate in-loop filtering network model corresponding to the luma component (candidate luma in-loop filtering network model, for short) or at least one candidate in-loop filtering network model corresponding to the chroma component (candidate chroma in-loop filtering network model, for short), may be acquired through model training.

In a possible implementation, for at least one candidate luma in-loop filtering network model, the method may further include operations as follows.

A first training set may be determined. The first training set may include at least one training sample. The at least one training sample may be acquired according to at least one type of quantization parameter (QP).

The at least one candidate luma in-loop filtering network model may be acquired by training a first neural network structure using a luma component of the at least one training sample in the first training set.

That is, the at least one candidate luma in-loop filtering network model may be determined by performing model training on the first neural network structure according to at least one training sample. The at least one candidate luma in-loop filtering network model may correspond to the colour component type and a quantization parameter (QP).

Here, the first neural network structure may include at least one of a convolution layer, an activation layer, a residual block, and a concatenation (Concat) layer. In a specific example, the first neural network structure may include a first convolution module, a first residual module, a second convolution module, and a first connected module.

Figure 6A:
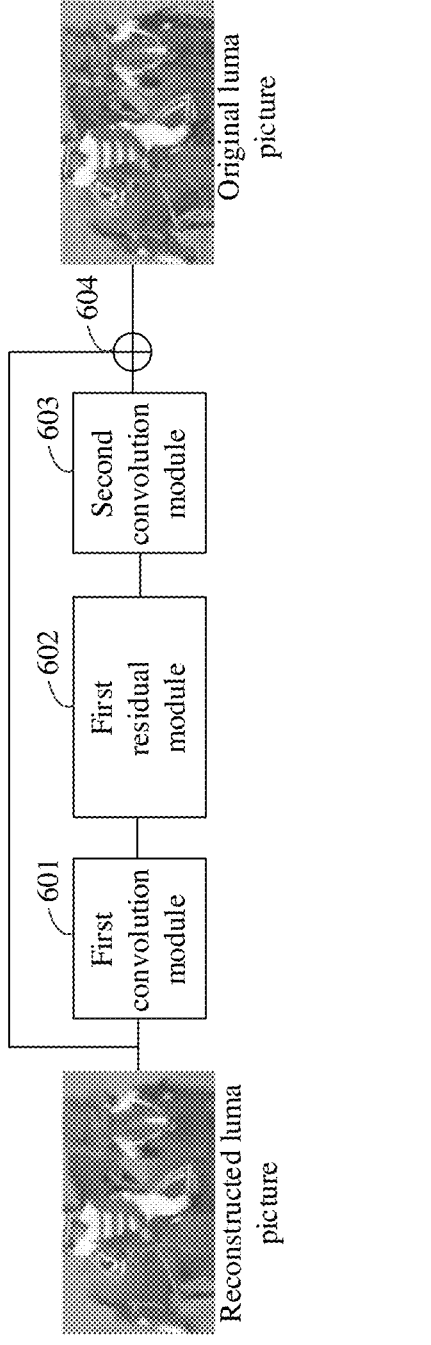
FIG. 6A is a diagram of composition of a network structure of a luma in-loop filtering network model according to embodiments of the disclosure.

Illustratively, as illustrated in FIG. 6A, a reconstructed luma picture may be input to the first neural network structure, outputting an original luma picture. The first neural network structure may include a first convolution module 601, a first residual module 602, a second convolution module 603, and a first connected module 604. In FIG. 6A, the first convolution module 601, the first residual module 602, the second convolution module 603, and the first connected module 604 may be connected in sequence. The first connected module 604 may be further connected with an input of the first convolution module 601.

In a more specific example, for the first neural network structure, the first convolution module consists of one convolution layer and one activation layer, the second convolution module consists of two convolution layers and one activation layer, the first connected module consists of a concatenation layer, and the first residual module includes several residual blocks. Each residual block may consist of two convolution layers and one activation layer.

In another possible implementation, for several candidate chroma in-loop filtering network models, the method may further include operations as follows.

A first training set may be determined. The first training set may include at least one training sample. The at least one training sample may be acquired according to at least one type of quantization parameter (QP).

The at least one candidate chroma in-loop filtering network model may be acquired by training a second neural network structure using a luma component and a chroma component of the at least one training sample in the first training set.

That is, the at least one candidate chroma in-loop filtering network model may be determined by performing model training on the second neural network structure according to at least one training sample. The at least one candidate chroma in-loop filtering network model may correspond to the colour component type and a quantization parameter (QP).

Here, the second neural network structure may include at least one of a sampling layer, a convolution layer, an activation layer, a residual block, a pooling layer, and a concatenation layer. In a specific example, the second neural network structure may include an up-sampling module, a third convolution module, a fourth convolution module, a fusion module, a second residual module, a fifth convolution module, and a second connected module.

Figure 6B:
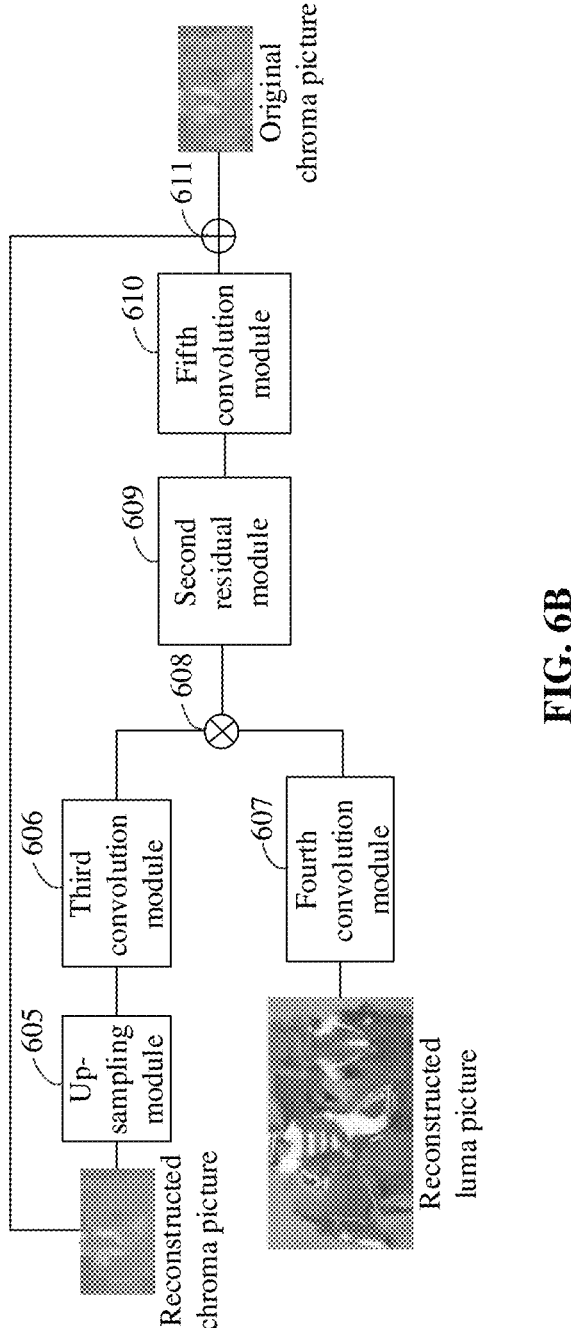
FIG. 6B is a diagram of composition of a network structure of a chroma in-loop filtering network model according to embodiments of the disclosure.

Illustratively, as illustrated in FIG. 6B, a reconstructed luma picture and a reconstructed chroma picture may be input to the second neural network structure, outputting an original chroma picture. The second neural network structure may include an up-sampling module 605, a third convolution module 606, a fourth convolution module 607, a fusion module 608, a second residual module 609, a fifth convolution module 610, and a second connected module 611. In FIG. 6B, the reconstructed chroma picture may be input to the up-sampling module 605. The up-sampling module 605 may be connected with the third convolution module 606. The reconstructed luma picture may be input to the fourth convolution module 607. The third convolution module 606 and the fourth convolution module 607 may be connected with the fusion module 608. The fusion module 608, the second residual module 609, the fifth convolution module 610, and the second connected module 611 may be connected in sequence. The second connected module 611 may be further connected with an input of the up-sampling module 605.

In a more specific example, for the second neural network structure, the third convolution module consists of one convolution layer and one activation layer, the fourth convolution module consists of one convolution layer and one activation layer, the fifth convolution module consists of two convolution layers, one activation layer, and one pooling layer, the second connected module consists of a concatenation layer, and the second residual module includes several residual blocks. Each residual block may consist of two convolution layers and one activation layer.

Figure 6C:
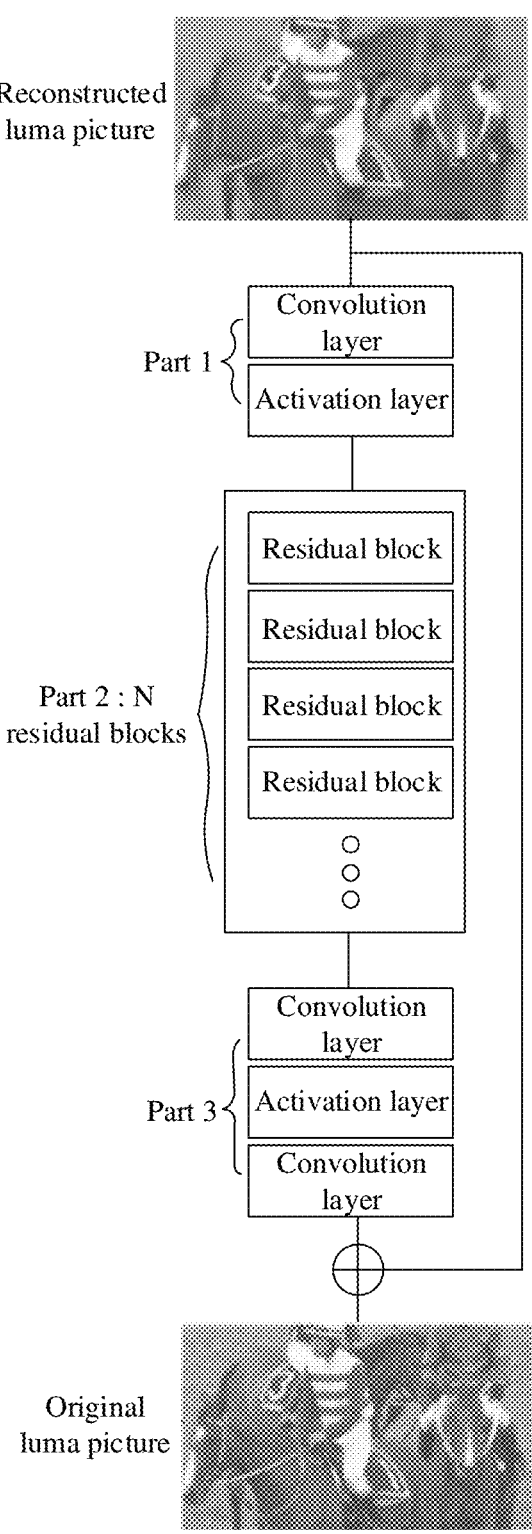
FIG. 6C is a diagram of composition of a network structure of another luma in-loop filtering network model according to embodiments of the disclosure.

Illustratively, the in-loop filtering network model is a CNNLF. In the CNNLF, different network structures may be devised respectively for the luma component and the chroma component. A first neural network structure may be devised for the luma component, as illustrated in FIG. 6C. A second neural network structure may be devised for the chroma component, as illustrated in FIG. 6D.

Figure 7:
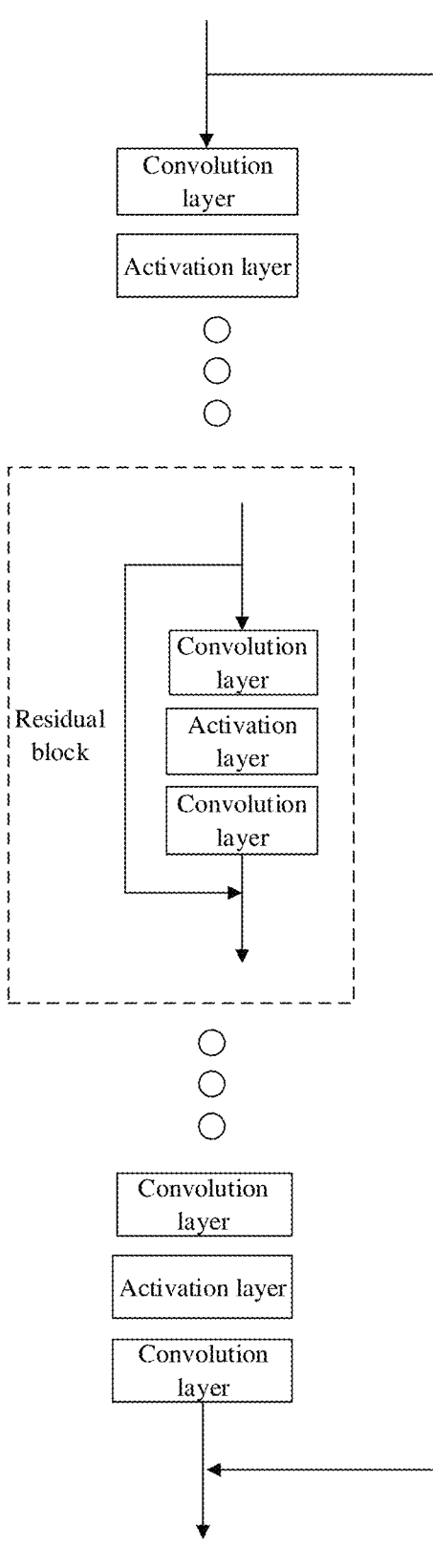
FIG. 7 is a diagram of composition of a network structure of a residual block according to embodiments of the disclosure.

For the luma component, as illustrated in FIG. 6C, the overall network structure may consist of a convolution layer, an activation layer, a residual block, a concatenation layer, etc. Here, a convolution layer may have a 3×3 convolution kernel, denoted by 3×3 Conv. An activation layer may be a linear activation function. That is, the activation layer may be denoted by and referred to as a rectified linear unit (ReLU), which is an activation function commonly used in an artificial neural network and generally refers to a nonlinear function represented by a ramp function and a variant thereof. As illustrated in a dashed box in FIG. 7, the network structure of a residual block (ResBlock) may consist of a convolution layer (Conv), an activation layer (ReLU), a concatenation layer (Concat), etc. A concatenation layer (Concat) may refer to an input-to-output global concatenation included in a network structure, enabling the network to focus on residual learning, accelerating network convergence.

Figure 6D:
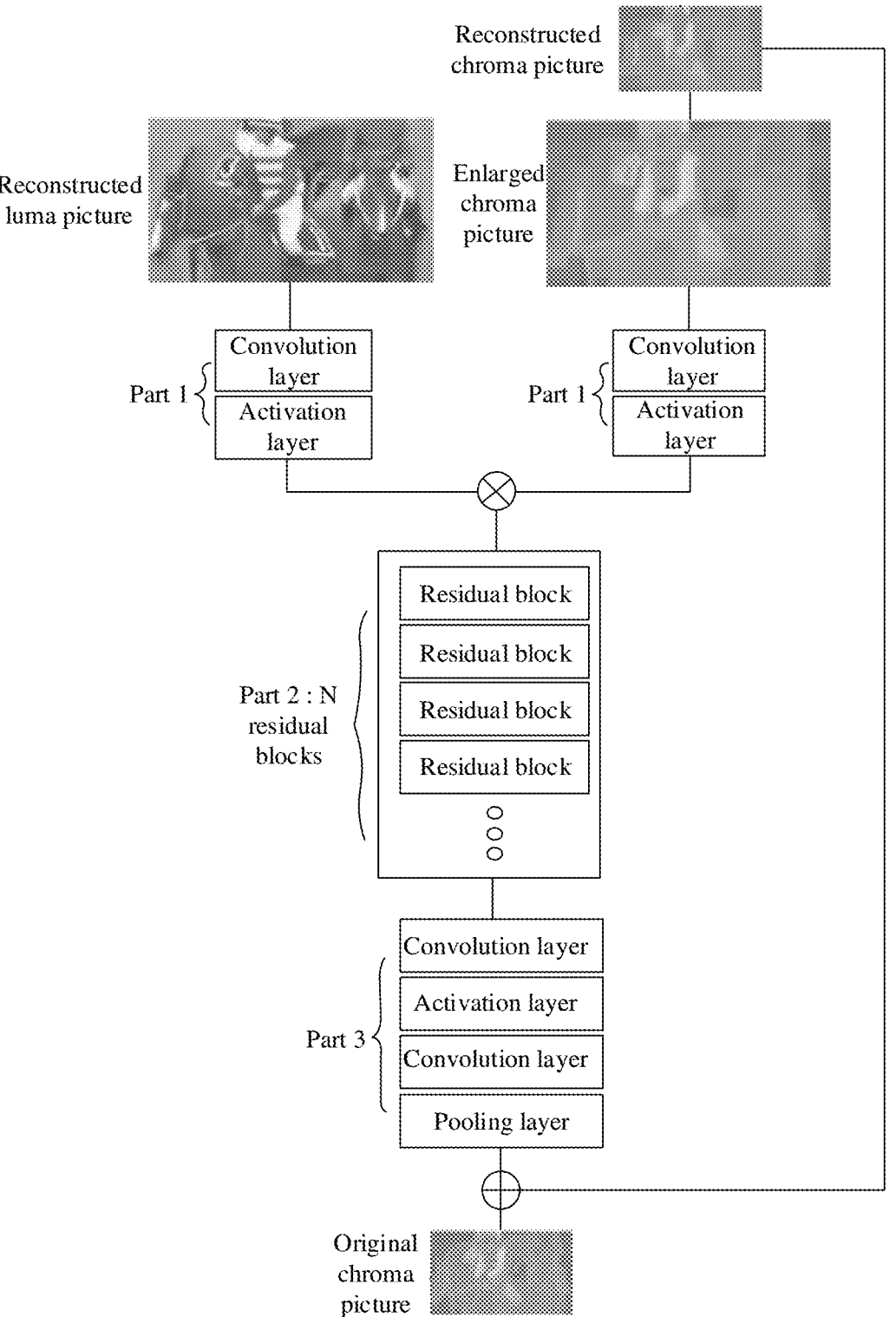
FIG. 6D is a diagram of composition of a network structure of another chroma in-loop filtering network model according to embodiments of the disclosure.

As illustrated in FIG. 6D, the luma component may be introduced here as an input to direct filtering the chroma component. The overall network structure may consist of a convolution layer, an activation layer, a residual block, a pooling layer, a concatenation layer, etc. Due to inconsistency in resolution, the chroma component first has to be up-sampled. To avoid introducing other noise during up-sampling, the resolution may be expanded by direct copying a neighbouring pixel, to acquire an enlarged chroma picture. In addition, at an end of the network structure, a pooling layer (such as an average pooling layer, denoted by 2×2 AvgPool) may further be used to downsample the chroma component. Specifically, in an HPM-ModAI application, the number of residual blocks of a luma component network may be set as N=20, and the number of residual blocks of a chroma component network may be set as N=10.

Thus, in model training, a total of 16 candidate in-loop filtering network models, including 4 I-frame luma component models, 4 non-I-frame luma component models, 4 chroma U component models, and 4 chroma V component models, may be trained offline.

Further note that if the output value corresponding to each candidate in-loop filtering network model of at least one candidate in-loop filtering network model is determined, a preset selection network model for the current block also has to be determined. A distinct colour component type may correspond to a distinct preset selection network model. Here, a preset selection network model corresponding to the luma component may be referred to as a luma selection network model. A preset selection network model corresponding to the chroma component may be referred to as a chroma selection network model.

In a possible implementation, in case the colour component type of the current block is the luma component, the luma selection network model for the current block may be determined as follows.

At least one candidate luma selection network model may be determined.

A quantization parameter (QP) of the current block may be determined. A candidate luma selection network model corresponding to the QP may be selected from the at least one candidate luma selection network model.

The selected candidate luma selection network model may be taken as the luma selection network model for the current block.

In another possible implementation, in case the colour component type of the current block is the chroma component, the chroma selection network model for the current block may be determined as follows.

At least one candidate chroma selection network model may be determined.

A quantization parameter (QP) of the current block may be determined. A candidate chroma selection network model corresponding to the QP may be selected from the at least one candidate chroma selection network model.

The selected candidate chroma selection network model may be taken as the chroma selection network model for the current block.

Note that the preset selection network model for the current block is related to both the QP and the colour component type. A distinct colour component type may correspond to a distinct preset selection network model. For example, for the luma component, the preset selection network model may be a luma selection network model related to the luma component. For the chroma component, the preset selection network model may be a chroma selection network model related to the chroma component.

Further note that at least one candidate luma selection network model and at least one candidate chroma selection network model may be trained beforehand according to different QPs, such as QP values 27~31, 32~37, 38~44, 45~50, etc. Thus, after the QP of the current block has been determined, the candidate luma selection network model corresponding to the QP, i.e., the luma selection network model for the current block, may be selected from at least one candidate luma selection network model. The candidate chroma selection network model corresponding to the QP, i.e., the chroma selection network model for the current block, may also be selected from at least one candidate chroma selection network model.

Further, to train at least one candidate luma selection network model and at least one candidate chroma selection network model, in some embodiments, the method may further include operations as follows.

A second training set may be determined. The second training set may include at least one training sample. The at least one training sample may be acquired according to at least one type of quantization parameter (QP).

The at least one candidate luma selection network model may be acquired by training a third neural network structure using a luma component of the at least one training sample in the second training set.

The at least one candidate chroma selection network model may be acquired by training the third neural network structure using a chroma component of the at least one training sample in the second training set.

The at least one candidate luma selection network model may correspond to the luma component and the QP. The at least one candidate chroma selection network model may correspond to the chroma component and the QP.

That is, each of the at least one candidate luma selection network model as well as the at least one candidate chroma selection network model may be determined by performing model training on the third neural network structure according to at least one training sample. Each of the at least one candidate luma selection network model as well as the at least one candidate chroma selection network model may correspond to the colour component type and the QP.

Here, the third neural network structure may include at least one of a convolution layer, a pooling layer, a fully connected layer, and an activation layer. In a specific example, the third neural network structure may include a sixth convolution module and a fully connected module. The sixth convolution module and the fully connected module may be connected in sequence.

In a more specific example, the sixth convolution module may include several convolution sub-modules. Each convolution sub-module may consist of one convolution layer and one pooling layer. The fully connected module may include several fully connected sub-modules. Each fully connected sub-module may consist of one fully connected layer and one activation layer.

That is, multiple CNN layers and multiple fully connected neural network layers may be selected to form a preset selection network model. Then, deep learning may be performed using a training sample to acquire the preset selection network model for the current block, such as the luma selection network model or the chroma selection network model.

In embodiments of the disclosure, deep learning may be a type of machine learning. Machine learning is required to implement artificial intelligence. The concept of deep learning originates from artificial neural network study. A multilayer perceptron including multiple hidden layers may be a deep learning structure. In deep learning, a more abstract high-level representative property category or feature may be formed by combining low-level features, to find a distributed feature representation of data. In embodiments of the disclosure, for example, convolutional neural networks (CNN) may be a type of feedforward neural networks including convolution and having a deep structure, and may be one of the representative deep learning algorithms. A preset selection network model here may be a CNN structure.

Illustratively, both a luma selection network model and a chroma selection network model may be acquired by training the third neural network structure. That is, in embodiments of the disclosure, a third neural network structure as illustrated in FIG. 8A and FIG. 8B may further be devised for a preset selection network model.

Figure 8A:
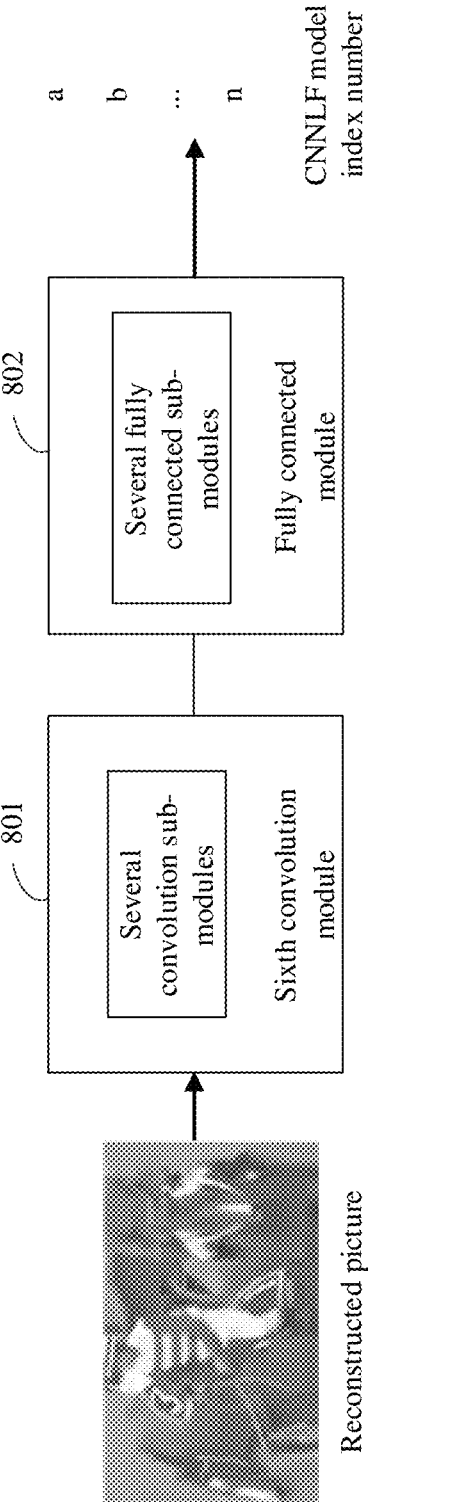
FIG. 8A is a diagram of a compositional structure of a preset selection network model according to embodiments of the disclosure.

As illustrated in FIG. 8A, a reconstructed picture may be input to the third neural network structure, outputting a probability distribution of respective candidate in-loop filtering network models when a current block is filtered by using an in-loop filtering network model. In FIG. 8A, the third neural network structure may include a sixth convolution module 801 and a fully connected module 802. The sixth convolution module 801 and the fully connected module 802 may be connected in sequence. The sixth convolution module 801 may include several convolution sub-modules. Each convolution sub-module may consist of one convolution layer and one pooling layer. The fully connected module 802 may include several fully connected sub-modules. Each fully connected sub-module may consist of one fully connected layer and one activation layer.

Figure 8B:
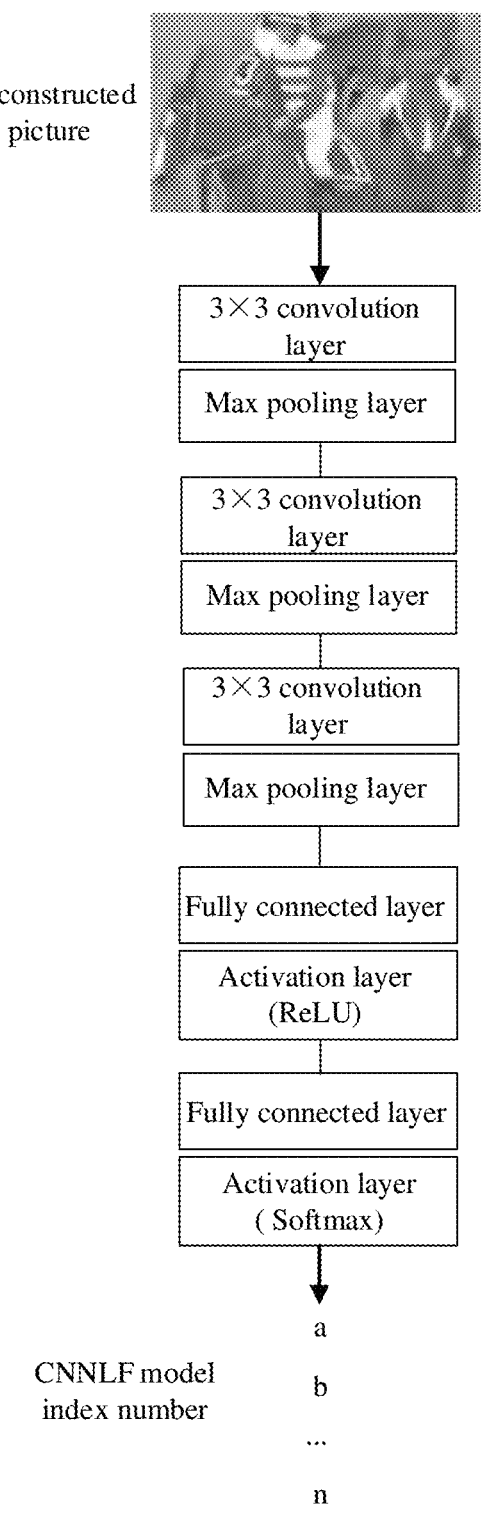
FIG. 8B is a diagram of a compositional structure of another preset selection network model according to embodiments of the disclosure.

In a specific example, as illustrated in FIG. 8B, the third neural network structure may consist of multiple CNN layers and multiple fully connected neural network layers. The network structure may include K convolution layers, M pooling layers, L fully connected layers, and N activation layers. Each of K, M, L, and N may be an integer greater than or equal to 1.

In a more specific example, K=3, M=3, L=2, and N=2.

Thus, the network structure illustrated in FIG. 8B may consist of 3 convolution layers and 2 fully connected layers. A pooling layer may be set following a convolution layer. A convolution layer may have a 3×3 convolution kernel, denoted by 3×3 Conv. A pooling layer may be a max pooling layer, denoted by 2×2 MaxPool. In addition, an activation layer may be set following a fully connected layer. Here, an activation layer may be a linear activation function, or a nonlinear activation function, such as ReLU, Softmax, etc.

Further, according to implementation described hereinbefore, after a preset selection network model and at least one candidate in-loop filtering network model have been determined, the probability distribution of the at least one candidate in-loop filtering network model may further be determined. In some embodiments, the output value corresponding to each of the at least one candidate in-loop filtering network model may be determined according to the preset selection network model as follows.

An input reconstructed picture block to be input to the in-loop filtering network model may be determined.

The output value corresponding to each of the at least one candidate in-loop filtering network model may be acquired by inputting the input reconstructed picture block to the preset selection network model.

Here, an in-loop filtering network model may refer to a CNNLF model described hereinbefore. For example, an output value is a probability value. After the input reconstructed picture block of the CNNLF model has been determined, the input reconstructed picture block of the CNNLF model may be input to the preset selection network model, and the preset selection network model may output a probability distribution of each of the at least one candidate in-loop filtering network model. That is, after the probability value of the at least one candidate in-loop filtering network model has been acquired, the in-loop filtering network model used to filter the current block may be determined according to the probability value. Specifically, a maximum probability value may be selected from the probability value of the at least one candidate in-loop filtering network model. The candidate in-loop filtering network model corresponding to the maximum probability value may be taken as the in-loop filtering network model used to filter the current block.

That is, several candidate luma in-loop filtering network model or several candidate chroma in-loop filtering network model may be trained first. Probability values of the number of candidate luma in-loop filtering network model or the number of candidate chroma in-loop filtering network model may be determined using a preset selection network model. Then, the candidate in-loop filtering network model of the maximum probability value may be selected as the in-loop filtering network model used to filter the current block, regardless if it is a luma in-loop filtering network model or a chroma in-loop filtering network model.

Further note that according to different colour component types, a preset selection network model may include a luma selection network model and a chroma selection network model. Thus, an input reconstructed picture block may also include an input reconstructed luma picture block and an input reconstructed chroma picture block.

In a possible implementation, when the colour component type of the current block is the luma component, the in-loop filtering network model used to filter the current block may be determined according to the preset selection network model as follows.

An input reconstructed luma picture block to be input to a luma in-loop filtering network model may be determined.

The output value corresponding to the each candidate luma in-loop filtering network model of the at least one candidate luma in-loop filtering network model may be acquired by inputting the input reconstructed luma picture block to the luma selection network model.

A target value may be determined from the output value corresponding to the each candidate luma in-loop filtering network model of the at least one candidate luma in-loop filtering network model. A candidate luma in-loop filtering network model corresponding to the target value may be taken as the luma in-loop filtering network model used to filter the current block.

Alternatively, when the colour component type of the current block is the chroma component, the in-loop filtering network model used to filter the current block may be determined according to the preset selection network model as follows.

An input reconstructed chroma picture block to be input to a chroma in-loop filtering network model may be determined.

The output value corresponding to the each candidate chroma in-loop filtering network model of the at least one candidate chroma in-loop filtering network model may be acquired by inputting the input reconstructed chroma picture block to the chroma selection network model.

A target value may be determined from the output value corresponding to the each candidate chroma in-loop filtering network model of the at least one candidate chroma in-loop filtering network model. A candidate chroma in-loop filtering network model corresponding to the target value may be taken as the chroma in-loop filtering network model used to filter the current block.

Thus, after an in-loop filtering network model used to filter the current block (including a luma in-loop filtering network model or a chroma in-loop filtering network model) has been determined, the current block may be filtered by using the selected in-loop filtering network model.

At S403, a reconstructed picture block of the current block is acquired through filtering the current block by using the in-loop filtering network model.

Note that an in-loop filtering network model according to embodiments of the disclosure may be a CNNLF model. Thus, the reconstructed picture block of the current block may be acquired by performing CNNLF filtering on the current block using a selected CNNLF model.

Further note that the input reconstructed picture block (including an input reconstructed luma picture block or an input reconstructed chroma picture block) may be acquired through filtering using a deblocking filter (DBF) and a sample adaptive offset (SAO) filter.

In some embodiments, the method may further include an operation as follows. After the reconstructed picture block of the current block has been determined, the reconstructed picture block may be further filtered by using an adaptive loop filter (ALF).

Figure 9:
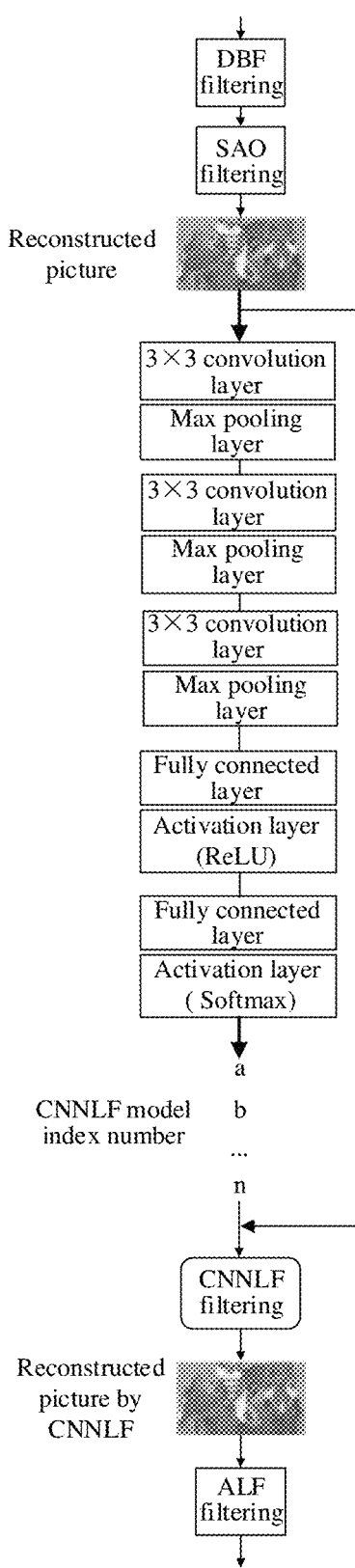
FIG. 9 is a diagram of an overall framework based on a preset selection network model according to embodiments of the disclosure.

Illustratively, FIG. 9 is a diagram of an overall framework using a preset selection network model according to embodiments of the disclosure. As illustrated in FIG. 9, with reference to the network structure illustrated in FIG. 8, the input reconstructed luma picture block or the input reconstructed chroma picture block of a CNNLF model may be input to the network structure, and the network structure may output the probability value of the CNNLF model. Then, the CNNLF model having the maximum probability value thereof may be selected to perform neural network filtering on the input reconstructed luma picture block or the input reconstructed chroma picture block. In addition, it may be seen in FIG. 9 that the input reconstructed picture block may be acquired through filtering using the deblocking filter (DBF) and the sample adaptive offset (SAO) filter. Then, the reconstructed picture block acquired using the MAS module and the CNNLF model may be further filtered by being input to the ALF.

The embodiment further provides a decoding method, implemented by a decoder. A bitstream is parsed, and a value of first syntax element identification information is determined. When the first syntax element identification information indicates that model selection using a preset selection network model is enabled for a current block, the preset selection network model for the current block is determined. An in-loop filtering network model used to filter the current block is determined according to the preset selection network model. A reconstructed picture block of the current block is acquired through filtering the current block by using the in-loop filtering network model. In this way, model adaptive selection based on deep learning is introduced. An in-loop filtering network model is selected from at least one candidate in-loop filtering network model using a preset selection network model, and then a current block is filtered according to the selected in-loop filtering network model. Therefore, the method not only improves coding performance, thereby improving encoding and decoding efficiencies, but also leads to a final output reconstructed picture block closer to an original picture block, improves a quality of a video picture.

In another embodiment of the disclosure, to lower complexity of a decoder, FIG. 10 is a flowchart of another decoding method according to embodiments of the disclosure. As illustrated in FIG. 10, the method may include operations as follows.

At S1001, a bitstream is parsed, and a value of first syntax element identification information is determined.

At S1002, an index number of an in-loop filtering network model may be determined by parsing the bitstream when the first syntax element identification information indicates that model selection using a preset selection network model is enabled for a current block.

At S1003, an in-loop filtering network model used to filter the current block may be determined from at least one candidate in-loop filtering network model according to the index number of the in-loop filtering network model.

At S1004, a reconstructed picture block of the current block may be acquired through filtering the current block by using the in-loop filtering network model.

Note that first syntax element identification information may be set. Then, the decoder may determine whether model selection using a preset selection network model is enabled for a current block according to the value of the first syntax element identification information acquired by decoding. The first syntax element identification information may be denoted by model_adaptive_selection_enable_flag.

In a specific example, if the value of model_adaptive_selection_enable_flag is the first value, then it may be determined that model selection using a preset selection network model is enabled for the current block. Alternatively, if the value of model_adaptive_selection_enable_flag is the second value, then it may be determined that model selection using a preset selection network model is disabled for the current block. Illustratively, the first value may be 1, and the second value may be 0, which is not limited in any way.

Further note that taking a CNNLF model as an example, the index number of a CNNLF model selected by the MAS module of the encoder may be encoded and signalled in the bitstream. The MAS module of the decoder may determine the CNNLF model used to filter the current block according to the index number of the CNNLF model acquire by decoding the bitstream, and filter the current block using the CNNLF model, thereby lowering complexity of the decoder.

Besides, each of the number of convolution layers, the number of fully connected layers, the nonlinear activation function, etc., included in the first neural network structure, the second neural network structure, the third neural network structure, etc., in foregoing embodiments may be adjusted. In addition, the MAS module may adaptively select an in-loop filtering network model such as a CNNLF model, another efficient neural network filter model, etc., which is not limited in any way in embodiments of the disclosure.

In short, embodiments of the disclosure propose a model adaptive selection (MAS) module based on deep learning, configured to adaptively select a CNNLF model, improving coding performance. The MAS module may be deemed as a preset selection network model consisting of multiple CNN layers and multiple fully connected neural network layers. An input reconstructed picture block to be input to a CNNLF model may be input to the MAS module, outputting the probability distribution of each CNNLF model. The MAS module may be located at a location in the encoder/decoder as illustrated in FIG. 5. Use of the MAS module does not depend on any switch of the DBF, the SAO, the ALF, and the CNNLF. It is just that the MAS module is located before the CNNLF.

In a specific example, a technical solution according to embodiments of the disclosure is implemented in the in-loop filtering module of the decoder, with a specific flow as follows.

The decoder may acquire and parse a bitstream. Parsing with respect to the in-loop filtering module may be processed according to a preset filter order. Here, the preset filter order may be DBF filtering→SAO filtering→MAS module→CNNLF filtering→ALF filtering. The flow may be as follows when entering the MAS module.

(a) First, it may be determined according to model_adaptive_selection_enable_flag acquired by decoding whether model selection using the MAS module is enabled for the current block. If model_adaptive_selection_enable_flag is 1, MAS module processing may be attempted for the current block, and the flow may go to (b). If model_adaptive_selection_enable_flag is 0, the flow may go to (e).

(b) The colour component type of the current block may be determined. The flow may go to (c) if the current block is a luma component block. The flow may go to (d) if the current block is a chroma component block.

(c) For the luma component, the input reconstructed luma picture block to be input to a CNNLF model may be input to the MAS module, outputting the probability distribution of each luma CNNLF model. A luma CNNLF model having the maximum probability value thereof may be selected as the CNNLF model used to filter the current luma picture block, and CNNLF filtering may be performed on the current luma picture block, acquiring the final reconstructed picture block.

(d) For the chroma component, the input reconstructed chroma picture block to be input to a CNNLF model may be input to the MAS module, outputting the probability distribution of each chroma CNNLF model. A chroma CNNLF model having the maximum probability value thereof may be selected as the CNNLF model used to filter the current chroma picture block, and CNNLF filtering may be performed on the current chroma picture block, acquiring the final reconstructed picture block.

(e) Once MAS module processing for the current picture completes, the next picture may be loaded and processed. Then, the flow may go to (a).

In implementation, syntax element modification is as illustrated in Table 1.

TABLE 1

| sequence_header( ) { | Descriptor |
|---|---|
| ... ... | |
| model_adaptive_selection_enable_flag | u(1) |
| ... ... | |
| } | |

Here, an enabling flag for a neural network based model adaptive selection may be model_adaptive_selection_enable_flag.

To sum up, in embodiments of the disclosure, by introducing model adaptive selection based on deep learning, the input reconstructed picture block to be input to a CNNLF model of a HPM-ModAI may be input to a neural network structure of multiple convolution layers and fully connected layers, outputting the probability distribution of each CNNLF model. A suitable CNNLF model may be adaptively selected to filter the input reconstructed picture block. Then, the input reconstructed picture block may be filtered by being input to the selected CNNLF model, leading to a final output reconstructed picture block closer to an original picture block, improving coding performance.

Illustratively, taking 4 non-I-frame luma component models in an HPM-ModAI as an example, the MAS module may be trained and tested. A technical solution according to embodiments of the disclosure may be implemented in an AVS3 intelligent coding reference software HPM11.0-ModAI6.0. An AVS3 required test sequence may be tested with the random access configuration of the universal intelligent coding test condition, as well as an anchor HPM11.0-ModAI6.0, and average changes in a BD-rate on the Y, U, V components may be −1.01%, 0.00%, and 0.04%, respectively, specifically as illustrated in Table 2. With the low delay B configuration of the universal intelligent coding test condition, average changes in the BD-rate may be −0.86%, −0.21%, and −0.30%, respectively, specifically as illustrated in Table 3. Data of Table 2 and Table 3 show that the technical solution improves coding performance. Specifically, with the technical solution, introduction of model adaptive selection based on deep learning brings a decent performance gain to an existing AVS3 intelligent coding reference software HPM-ModAI.

TABLE 2

| | Random Access | | |
|---|---|---|---|
| | Y | U | V |
| Channel I 4 K | −0.80% | −0.03% | −0.06% |
| Channel II 1080P | −1.31% | −0.12% | −0.05% |
| Channel III 720P | −0.91% | 0.15% | 0.24% |
| Overall | −1.01% | 0.00% | 0.04% |

TABLE 3

| | Low Delay B | | |
|---|---|---|---|
| | Y | U | V |
| Channel I 4 K | −0.85% | −0.19% | 0.00% |
| Channel II 1080P | −1.34% | −0.32% | −0.40% |
| Channel III 720P | −0.39% | −0.12% | −0.48% |
| Overall | −0.86% | −0.21% | −0.30% |

Specific implementation of an embodiment described hereinbefore is elaborated with the above embodiment, which shows that with the technical solution of an embodiment described hereinbefore, model adaptive selection based on deep learning is introduced, not only improving coding performance, thereby improving encoding and decoding efficiencies, but also leading to a final output reconstructed picture block closer to an original picture block, improving quality of a video picture.

In yet another embodiment of the disclosure, FIG. 11 is a flowchart of an encoding method according to embodiments of the disclosure. As illustrated in FIG. 11, the method includes an operation as follows.

At S1101, a value of first syntax element identification information is determined.

Note that a video picture may be partitioned into multiple picture blocks. Each picture block to be encoded currently may be referred to as a coding block. Here, each coding block may include a first colour component, a second colour component, and a third colour component. A current block may be a coding block in the video picture, the first colour component, the second colour component, or the third colour component of which is currently to go through in-loop filtering.

Here, in embodiments of the disclosure, the first colour component, the second colour component, and the third colour component may be divided into two types of colour components, i.e., a luma component and a chroma component. In this case, if an operation such as prediction, inverse transform and inverse quantization, in-loop filtering, etc., is to be performed on the luma component of the current block, then the current block may also be referred to as a luma block. Alternatively, if an operation such as prediction, inverse transform and inverse quantization, in-loop filtering, etc., is to be performed on the chroma component of the current block, then the current block may also be referred to as a chroma block.

Further note that at the encoder side, embodiments of the disclosure specifically provide an in-loop filtering method, particularly a method for model adaptive selection based on deep learning. The method may apply to the filtering unit 108 as illustrated in FIG. 3A. Here, the filtering unit 108 may include a DBF, a SAO filter, a CNNLF, and an ALF. A method according to embodiments of the disclosure is specifically implemented between the SAO and the CNNLF to adaptively select a CNNLF model. Then, a suitable model may be selected to perform CNNLF filtering.

More specifically, embodiments of the disclosure propose a model adaptive selection (MAS) module based on deep learning, specifically as the MAS module as illustrated in FIG. 5, configured to adaptively select an in-loop filtering network model (such as a CNNLF model) to improve coding performance.

In embodiments of the disclosure, first syntax element identification information may be configured to indicate whether the MAS module is enabled to perform model selection using a preset selection network model for the current block. In some embodiments, the value of the first syntax element identification information is determined as follows.

If model selection using the preset selection network model is enabled for the current block, the value of the first syntax element identification information may be determined to be a first value.

Alternatively, if model selection using the preset selection network model is disabled for the current block, the value of the first syntax element identification information may be determined to be a second value.

The method may further include operations as follows. The value of the first syntax element identification information may be encoded, and an encoded bit may be signalled in a bitstream.

That is, first syntax element identification information may be set first to indicate whether model selection using a preset selection network model is enabled for a current block. Here, if model selection using a preset selection network model is enabled for the current block, the value of the first syntax element identification information may be determined to be a first value. Alternatively, if model selection using a preset selection network model is disabled for the current block, the value of the first syntax element identification information may be determined to be a second value. Thus, having determined the value of the first syntax element identification information, the encoder may signal the value of the first syntax element identification information in the bitstream to transmit the value of the first syntax element identification information to the decoder, such that by parsing the bitstream the decoder may learn whether model selection using a preset selection network model is enabled for the current block.

Here, the first value and the second value differ. The first value and the second value may be parametric. The first value and the second value may be digital. Specifically, the first syntax element identification information may be a parameter signalled in a profile, and may also be the value of a flag, which is not limited in any way in embodiments of the disclosure.

For example, the first syntax element identification information is a flag. In this case, the first value may be set as 1, and the second value may be set as 0. Alternatively, the first value may further be set as true, and the second value may further be set as false. Alternatively, the first value may further be set as 0, and the second value may further be set as 1. Alternatively, the first value may further be set as false, and the second value may further be set as true. Illustratively, for a flag, in general, the first value may be 1, and the second value may be 0, which however is not limited in any way.

Further note that the preset selection network model may be deemed as a neural network, and the first syntax element identification information may be deemed as an enabling flag for a neural network based model adaptive selection, which may be denoted here by model_adaptive_selection_enable_flag. Specifically, model_adaptive_selection_enable_flag may be configured to indicate whether model selection using the preset selection network model is enabled for the current block.

Thus, for example, the first value is 1, and the second value is 0. It may be determined that model selection using a preset selection network model is enabled for the current block if the value of model_adaptive_selection_enable_flag is 1. It may be determined that model selection using a preset selection network model is disabled for the current block if the value of model_adaptive_selection_enable_flag is 0.

At S1102, when the first syntax element identification information indicates that model selection using a preset selection network model is enabled for a current block, the preset selection network model for the current block is determined. An in-loop filtering network model used to filter the current block is determined according to the preset selection network model.

Note that if model selection using a preset selection network model is enabled for the current block, then after the preset selection network model for the current block has been determined, the in-loop filtering network model used to filter the current block is determined according to the preset selection network model.

In some embodiments, the in-loop filtering network model used to filter the current block may be determined according to the preset selection network model as follows.

An output value corresponding to each candidate in-loop filtering network model of at least one candidate in-loop filtering network model may be determined according to the preset selection network model.

The in-loop filtering network model used to filter the current block may be determined according to the output value corresponding to each of the at least one candidate in-loop filtering network model.

Further, in some embodiments, the in-loop filtering network model used to filter the current block may be determined according to the output value corresponding to each of the at least one candidate in-loop filtering network model as follows.

A target value may be determined from the output value corresponding to each of the at least one candidate in-loop filtering network model. A candidate in-loop filtering network model corresponding to the target value may be taken as the in-loop filtering network model used to filter the current block.

In a specific example, the target value may be determined from the output value corresponding to each of the at least one candidate in-loop filtering network model as follows. A maximum value of the output value corresponding to each of the at least one candidate in-loop filtering network model may be selected. The maximum value may be taken as the target value.

That is, an output value corresponding to each candidate in-loop filtering network model of at least one candidate in-loop filtering network model may be determined according to the preset selection network model. A target value (such as the maximum value) of the output value corresponding to each of the at least one candidate in-loop filtering network model may be determined. A candidate in-loop filtering network model corresponding to the target value (such as the maximum value) may be taken as the in-loop filtering network model used to filter the current block.

Further note that the output value may be a probability value. Specifically, the output value corresponding to each of the at least one candidate in-loop filtering network model may be configured to reflect a probability distribution of each of the at least one candidate in-loop filtering network model.

Further note that a preset selection network model may differ for different types of colour components. In embodiments of the disclosure, a preset selection network model corresponding to the luma component may be referred to as a luma selection network model. A preset selection network model corresponding to the chroma component may be referred to as a chroma selection network model. Therefore, in some embodiments, the preset selection network model for the current block may be determined as follows.

A luma selection network model for the current block may be determined if a colour component type of the current block is a luma component.

A chroma selection network model for the current block may be determined if the colour component type of the current block is a chroma component, Accordingly, a candidate in-loop filtering network model may also differ for different types of colour components. In embodiments of the disclosure, a candidate in-loop filtering network model corresponding to the luma component may be referred to as a candidate luma in-loop filtering network model. A candidate in-loop filtering network model corresponding to the chroma component may be referred to as a candidate chroma in-loop filtering network model. Therefore, in some embodiments, the output value corresponding to each of the at least one candidate in-loop filtering network model may be determined according to the preset selection network model as follows.

If the colour component type of the current block is the luma component, an output value corresponding to each candidate luma in-loop filtering network model of at least one candidate luma in-loop filtering network model may be determined according to the luma selection network model.

If the colour component type of the current block is the chroma component, an output value corresponding to each candidate chroma in-loop filtering network model of at least one candidate chroma in-loop filtering network model may be determined according to the chroma selection network model.

That is, there may be two types of colour components, i.e., the luma component and the chroma component. In embodiments of the disclosure, a current block may be referred to as a luma block if the colour component type of the current block is the luma component, in which case a luma selection network model for the current block is to be determined. Then, an output value corresponding to each candidate luma in-loop filtering network model of at least one candidate luma in-loop filtering network model is to be determined according to the luma selection network model. A current block may be referred to as a chroma block if the colour component type of the current block is the chroma component, in which case a chroma selection network model for the current block is to be determined. Then, an output value corresponding to each candidate chroma in-loop filtering network model of at least one candidate chroma in-loop filtering network model is to be determined according to the chroma selection network model.

Further note that a candidate in-loop filtering network model, regardless if it is at least one candidate in-loop filtering network model corresponding to the luma component (candidate luma in-loop filtering network model, for short) or at least one candidate in-loop filtering network model corresponding to the chroma component (candidate chroma in-loop filtering network model, for short), may be acquired through model training.

In a possible implementation, for at least one candidate luma in-loop filtering network model, the method may further include operations as follows.

A first training set may be determined. The first training set may include at least one training sample. The at least one training sample may be acquired according to at least one type of quantization parameter (QP).

The at least one candidate luma in-loop filtering network model may be acquired by training a first neural network structure using a luma component of the at least one training sample in the first training set.

That is, the at least one candidate luma in-loop filtering network model may be determined by performing model training on the first neural network structure according to at least one training sample. The at least one candidate luma in-loop filtering network model may correspond to the colour component type and a quantization parameter (QP).

Here, the first neural network structure may include at least one of a convolution layer, an activation layer, a residual block, and a concatenation (Concat) layer.

In a specific example, the first neural network structure may include a first convolution module, a first residual module, a second convolution module, and a first connected module. For the first neural network structure, the first convolution module may consist of one convolution layer and one activation layer, the second convolution module may consist of two convolution layers and one activation layer, the first connected module may consist of a concatenation layer, and the first residual module may include several residual blocks. Each residual block may consist of two convolution layers and one activation layer.

In another possible implementation, for several candidate chroma in-loop filtering network models, the method may further include operations as follows.

A first training set may be determined. The first training set may include at least one training sample. The at least one training sample may be acquired according to at least one type of quantization parameter (QP).

The at least one candidate chroma in-loop filtering network model may be acquired by training a second neural network structure using a luma component and a chroma component of the at least one training sample in the first training set.

Here, the second neural network structure may include at least one of a sampling layer, a convolution layer, an activation layer, a residual block, a pooling layer, and a concatenation layer.

In a specific example, the second neural network structure may include an up-sampling module, a third convolution module, a fourth convolution module, a fusion module, a second residual module, a fifth convolution module, and a second connected module. For the second neural network structure, the third convolution module may consist of one convolution layer and one activation layer, the fourth convolution module may consist of one convolution layer and one activation layer, the fifth convolution module may consist of two convolution layers, one activation layer, and one pooling layer, the second connected module may consist of a concatenation layer, and the second residual module may include several residual blocks. Each residual block may consist of two convolution layers and one activation layer.

Illustratively, the in-loop filtering network model is a CNNLF. In the CNNLF, different network structures may be devised respectively for the luma component and the chroma component. A first neural network structure may be devised for the luma component, as illustrated in FIG. 6A and FIG. 6C. A second neural network structure may be devised for the chroma component, as illustrated in FIG. 6B and FIG. 6D.

Further note that if the output value corresponding to each candidate in-loop filtering network model of at least one candidate in-loop filtering network model is determined, a preset selection network model for the current block also has to be determined. A distinct colour component type may correspond to a distinct preset selection network model. Here, a preset selection network model corresponding to the luma component may be referred to as a luma selection network model. A preset selection network model corresponding to the chroma component may be referred to as a chroma selection network model.

In a possible implementation, in case the colour component type of the current block is the luma component, the luma selection network model for the current block may be determined as follows.

At least one candidate luma selection network model may be determined.

A quantization parameter (QP) of the current block may be determined. A candidate luma selection network model corresponding to the QP may be selected from the at least one candidate luma selection network model.

The selected candidate luma selection network model may be taken as the luma selection network model for the current block.

In another possible implementation, in case the colour component type of the current block is the chroma component, the chroma selection network model for the current block may be determined as follows.

At least one candidate chroma selection network model may be determined.

A quantization parameter (QP) of the current block may be determined. A candidate chroma selection network model corresponding to the QP may be selected from the at least one candidate chroma selection network model.

The selected candidate chroma selection network model may be taken as the chroma selection network model for the current block.

Note that the preset selection network model for the current block is related to both the QP and the colour component type. A distinct colour component type may correspond to a distinct preset selection network model. For example, for the luma component, the preset selection network model may be a luma selection network model related to the luma component. For the chroma component, the preset selection network model may be a chroma selection network model related to the chroma component.

Further note that at least one candidate luma selection network model and at least one candidate chroma selection network model may be trained beforehand according to different QPs, such as QP values 27-31, 32-37, 38-44, 45-50, etc. Thus, after the QP of the current block has been determined, the candidate luma selection network model corresponding to the QP, i.e., the luma selection network model for the current block, may be selected from at least one candidate luma selection network model. The candidate chroma selection network model corresponding to the QP, i.e., the chroma selection network model for the current block, may also be selected from at least one candidate chroma selection network model.

Further, to train at least one candidate luma selection network model and at least one candidate chroma selection network model, in some embodiments, the method may further include operations as follows.

A second training set may be determined. The second training set may include at least one training sample. The at least one training sample may be acquired according to at least one type of quantization parameter (QP).

The at least one candidate luma selection network model may be acquired by training a third neural network structure using a luma component of the at least one training sample in the second training set.

The at least one candidate chroma selection network model may be acquired by training the third neural network structure using a chroma component of the at least one training sample in the second training set.

The at least one candidate luma selection network model may correspond to the luma component and the QP. The at least one candidate chroma selection network model may correspond to the chroma component and the QP.

That is, each of the at least one candidate luma selection network model as well as the at least one candidate chroma selection network model may be determined by performing model training on the third neural network structure according to at least one training sample. Each of the at least one candidate luma selection network model as well as the at least one candidate chroma selection network model may correspond to the colour component type and the QP.

Note that the third neural network structure may include at least one of a convolution layer, a pooling layer, a fully connected layer, and an activation layer.

In a specific example, the third neural network structure may include a sixth convolution module and a fully connected module. The sixth convolution module and the fully connected module may be connected in sequence. The sixth convolution module may include several convolution sub-modules. Each convolution sub-module may consist of one convolution layer and one pooling layer. The fully connected module may include several fully connected sub-modules. Each fully connected sub-module may consist of one fully connected layer and one activation layer.

That is, multiple CNN layers and multiple fully connected neural network layers may be selected to form the third neural network structure. Then, deep learning may be performed using a training sample to acquire the preset selection network model for the current block, such as the luma selection network model or the chroma selection network model.

Taking FIG. 8A and FIG. 8B as an example, the third neural network structure may consist of 3 convolution layers and 2 fully connected layers. A pooling layer may be set following a convolution layer. A convolution layer may have a 3×3 convolution kernel, denoted by 3×3 Conv. A pooling layer may be a max pooling layer, denoted by 2×2 MaxPool. In addition, an activation layer may be set following a fully connected layer. Here, an activation layer may be a linear activation function, or a nonlinear activation function, such as ReLU, Softmax, etc.

Further, according to implementation described hereinbefore, after a preset selection network model and at least one candidate in-loop filtering network model have been determined, the probability distribution of the at least one candidate in-loop filtering network model may further be determined. In some embodiments, the output value corresponding to each of the at least one candidate in-loop filtering network model may be determined according to the preset selection network model as follows.

An input reconstructed picture block to be input to the in-loop filtering network model may be determined.

The output value corresponding to each of the at least one candidate in-loop filtering network model may be acquired by inputting the input reconstructed picture block to the preset selection network model.

Here, an in-loop filtering network model may refer to a CNNLF model described hereinbefore. For example, an output value is a probability value. After the input reconstructed picture block of the CNNLF model has been determined, the input reconstructed picture block of the CNNLF model may be input to the preset selection network model, and the preset selection network model may output a probability distribution of the at least one candidate in-loop filtering network model. That is, after the probability value of the at least one candidate in-loop filtering network model has been acquired, the in-loop filtering network model used to filter the current block may be determined according to the probability value. Specifically, a maximum probability value may be selected from the probability value of the at least one candidate in-loop filtering network model. The candidate in-loop filtering network model corresponding to the maximum probability value may be taken as the in-loop filtering network model used to filter the current block.

That is, several candidate luma in-loop filtering network model or several candidate chroma in-loop filtering network model may be trained first. Probability values of the number of candidate luma in-loop filtering network model or the number of candidate chroma in-loop filtering network model may be determined using a preset selection network model. Then, the candidate in-loop filtering network model of the maximum probability value may be selected as the in-loop filtering network model used to filter the current block, regardless if it is a luma in-loop filtering network model or a chroma in-loop filtering network model.

Further note that according to different colour component types, a preset selection network model may include a luma selection network model and a chroma selection network model. Thus, an input reconstructed picture block may also include an input reconstructed luma picture block and an input reconstructed chroma picture block.

In a possible implementation, when the colour component type of the current block is the luma component, the in-loop filtering network model used to filter the current block may be determined according to the preset selection network model as follows.

An input reconstructed luma picture block to be input to a luma in-loop filtering network model may be determined.

The output value corresponding to the each candidate luma in-loop filtering network model of the at least one candidate luma in-loop filtering network model may be acquired by inputting the input reconstructed luma picture block to the luma selection network model.

A target value may be determined from the output value corresponding to the each candidate luma in-loop filtering network model of the at least one candidate luma in-loop filtering network model. A candidate luma in-loop filtering network model corresponding to the target value may be taken as the luma in-loop filtering network model used to filter the current block.

Alternatively, when the colour component type of the current block is the chroma component, the in-loop filtering network model used to filter the current block may be determined according to the preset selection network model as follows.

An input reconstructed chroma picture block to be input to a chroma in-loop filtering network model may be determined.

The output value corresponding to the each candidate chroma in-loop filtering network model of the at least one candidate chroma in-loop filtering network model may be acquired by inputting the input reconstructed chroma picture block to the chroma selection network model.

A target value may be determined from the output value corresponding to the each candidate chroma in-loop filtering network model of the at least one candidate chroma in-loop filtering network model. A candidate chroma in-loop filtering network model corresponding to the target value may be taken as the chroma in-loop filtering network model used to filter the current block.

Thus, after an in-loop filtering network model used to filter the current block (including a luma in-loop filtering network model or a chroma in-loop filtering network model) has been determined, the current block may be filtered by using the selected in-loop filtering network model.

Further, to lower complexity, in some embodiments, after the in-loop filtering network model used to filter the current block has been determined, the method may further include operations as follows.

An index number of an in-loop filtering network model corresponding to the in-loop filtering network model may be determined.

The index number of the in-loop filtering network model may be encoded, and an encoded bit may be signalled in a bitstream.

Thus, taking a CNNLF model as an example, the index number of a CNNLF model selected by the MAS module of the encoder may be encoded and signalled in the bitstream. Then, the decoder may determine the CNNLF model used to filter the current block directly according to the index number of the CNNLF model acquire by decoding the bitstream, and filter the current block using the CNNLF model, thereby lowering complexity of the decoder.

At S1103, a reconstructed picture block of the current block is acquired through filtering the current block by using the in-loop filtering network model.

Note that as a model is selected from multiple candidate in-loop filtering network models using the preset selection network model, after it has been determined whether model selection using a preset selection network model is enabled for the current block, if model selection using a preset selection network model is enabled for the current block, then after an in-loop filtering network model configured to filter the current block has been selected, it is to further determine whether the current block is filtered by using the in-loop filtering network model. Thus, filtering is performed just when it is determined that the current block is filtered by using the in-loop filtering network model.

In embodiments of the disclosure, a syntax element identification information may be set for each of the luma component and the chroma component of a video sequence, a current picture, a current block, etc., to determine whether the video sequence, the current picture, the current block, etc., is filtered by using an in-loop filtering network model. Then, information indicated by the syntax element identification information may be determined by parsing the bitstream. Alternatively, a syntax element identification information may be set for just the current block and/or the current picture. Then, information indicated by the syntax element identification information may be determined by parsing the bitstream. In embodiments of the disclosure, a syntax element identification information (such as the second syntax element identification information, the first luma syntax element identification information, the second luma syntax element identification information, and the chroma syntax element identification information, etc.) may be set for each of the video sequence, the current picture, and the current block, which however is not specifically limited here.

In a possible implementation, first, a sequence header identification may be set to indicate whether the current block is filtered by using an in-loop filtering network model. For example, the second syntax element identification information may be set to indicate whether a current video sequence is filtered by using an in-loop filtering network model. Therefore, in some embodiments, the method may further include an operation as follows.

If the video sequence is to be filtered by using an in-loop filtering network model, a value of second syntax element identification information may be determined to be a first value.

Alternatively, if the video sequence is not to be filtered by using an in-loop filtering network model, the value of the second syntax element identification information may be determined to be a second value.

The method may further include operations as follows. The value of the second syntax element identification information may be encoded, and an encoded bit may be signalled in a bitstream.

Note that the first value and the second value differ.

For example, the second syntax element identification information is flag information. In this case, the first value may be set as 1, and the second value may be set as 0. Alternatively, the first value may further be set as true, and the second value may further be set as false. Alternatively, the first value may further be set as 0, and the second value may further be set as 1. Alternatively, the first value may further be set as false, and the second value may further be set as true, which is not limited in any way in embodiments of the disclosure.

Further note that the video sequence may include at least one picture. The at least one picture may include a current picture. Here, when it is determined that the video sequence is filtered by using an in-loop filtering network model, in embodiments of the disclosure, it further has to be determined whether the current picture in the video sequence is filtered by using an in-loop filtering network model. That is, a third syntax element identification information further has to be set. The third syntax element identification information for a luma component may have a meaning different from that of the third syntax element identification information for a chroma component.

In embodiments of the disclosure, for the luma component of the current picture, the third syntax element identification information may be assumed to be first luma syntax element identification information indicating whether the luma component of the current picture is filtered by using a luma in-loop filtering network model. For the chroma component of the current picture, the third syntax element identification information may be assumed to be the chroma syntax element identification information indicating whether the chroma component of the current picture is filtered by using a chroma in-loop filtering network model.

Thus, after it has been determined that the video sequence is filtered by using an in-loop filtering network model, when the colour component type of the current picture is the luma component, it may be determined that the in-loop filtering network model is a luma in-loop filtering network model. In this case, in a possible implementation, the method may further include operations as follows.

A first rate distortion cost of filtering a luma component of the current picture using a luma in-loop filtering network model may be determined. A second rate distortion cost of not filtering the luma component of the current picture using the luma in-loop filtering network model may be determined.

The value of the first luma syntax element identification information may be determined according to the first rate distortion cost and the second rate distortion cost.

In a specific example, the value of the first luma syntax element identification information may be determined according to the first rate distortion cost and the second rate distortion cost as follows.

A value of first luma syntax element identification information may be determined to be the first value if the first rate distortion cost is less than the second rate distortion cost. Additionally or alternatively, the value of the first luma syntax element identification information may be determined to be the second value if the first rate distortion cost is greater than or equal to the second rate distortion cost.

The method may further include operations as follows. The value of the first luma syntax element identification information may be encoded, and an encoded bit may be signalled in a bitstream.

Note that for the luma component, if the value of the first luma syntax element identification information is the first value, which means that the luma component of the current picture is to be filtered by using a luma in-loop filtering network model, it further has to be determined whether the luma component of the current block in the current picture is filtered by using a luma in-loop filtering network model. Therefore, in some embodiments, when the first rate distortion cost is less than the second rate distortion cost, the method may further include operations as follows.

A third rate distortion cost of filtering a luma component of the current block using a luma in-loop filtering network model may be determined. A fourth rate distortion cost of not filtering the luma component of the current block using the luma in-loop filtering network model may be determined.

A value of second luma syntax element identification information may be determined to be the first value if the third rate distortion cost is less than the fourth rate distortion cost. Additionally or alternatively, the value of the second luma syntax element identification information may be determined to be the second value if the third rate distortion cost is greater than or equal to the fourth rate distortion cost.

The method may further include operations as follows. The value of the second luma syntax element identification information may be encoded, and an encoded bit may be signalled in a bitstream.

That is, for the luma component, two syntax elements may be involved here, i.e., a picture-level syntax element and a CTU-level syntax element. The picture-level syntax element may be referred to as the first luma syntax element identification information. The CTU-level syntax element may be referred to as the second luma syntax element identification information. Assuming that the first luma syntax element identification information and the second luma syntax element identification information are flag information, the first luma syntax element identification information may be denoted by luma_picture_flag, and the second luma syntax element identification information may be denoted by luma_ctu_flag. Here, both the value of the first luma syntax element identification information and the value of the second luma syntax element identification information may be determined in a rate distortion cost mode.

Taking the first luma syntax element identification information as an example, in some embodiments, the method may further include an operation as follows. The current picture may be partitioned into at least one partition block. The at least one partition block may include the current block.

Accordingly, the first rate distortion cost of filtering the luma component of the current picture using a luma in-loop filtering network model may be determined as follows.

The third rate distortion cost of filtering the luma component of the at least one partition block using a luma in-loop filtering network model may be computed respectively.

The first rate distortion cost may be acquired as a sum of the computed third rate distortion cost.

The second rate distortion cost of not filtering the luma component of the current picture using a luma in-loop filtering network model may be computed as follows.

The fourth rate distortion cost of not filtering the luma component of the at least one partition block using a luma in-loop filtering network model may be computed respectively.

The second rate distortion cost may be acquired as a sum of the computed fourth rate distortion cost.

That is, the third rate distortion cost of filtering the luma component of each block using a luma in-loop filtering network model may be computed. Then, the first rate distortion cost of filtering the current picture may be acquired as a sum of third rate distortion costs. In a specific example, in rate distortion cost computation, a distortion value may be determined according to a mean-square error.

In a possible implementation, the reconstructed picture block of the luma component of each block may be acquired through filtering the luma component of the each block by using a luma in-loop filtering network model. Then, the mean-square error of the reconstructed picture block with respect to the original picture block may be computed, acquiring the mean-square error of each block. The third rate distortion cost of filtering each block may be computed using a rate distortion cost formula RDcost=D+λ*R. D may be the mean-square error of each block. R may be 1. λ may be kept the same as λ of the ALF. Finally, the first rate distortion cost of filtering the current picture may be acquired as a sum of the third rate distortion cost of filtering each block.

In another possible implementation, the reconstructed picture block of the luma component of each block may be acquired through filtering the luma component of the each block by using a luma in-loop filtering network model. Then, the mean-square error of the reconstructed picture block with respect to the original picture block may be computed, acquiring the mean-square error of each block. The mean-square error of the current picture may be acquired as a sum over each block. Then, the first rate distortion cost may be computed using a rate distortion cost formula RDcost=D+λ*R. D may be the mean-square error of the current picture. R may be the number of blocks included in the current picture. λ may be kept the same as λ of the ALF.

Further note that the fourth rate distortion cost of not filtering the luma component of a block using a luma in-loop filtering network model may be computed. Then, the second rate distortion cost of not filtering the current picture may be acquired as a sum over respective fourth rate distortion costs. Here, in rate distortion cost computation, a distortion value may also be determined according to a mean-square error. In this case, the mean-square error refers to that of an output reconstructed picture block not filtered by using a luma in-loop filtering network model with respect to the original picture block. The other computation is the same as in computing the first rate distortion cost, which is not elaborated here.

Thus, for example, the first value is 1, and the second value is 0. After the first rate distortion cost and the second rate distortion cost have been acquired, the first rate distortion cost may be compared to the second rate distortion cost. If the first rate distortion cost is greater than or equal to the second rate distortion cost, it may be determined that the value of the first luma syntax element identification information is 0, which means that the luma component of the current picture is not filtered by using a luma in-loop filtering network model. In this case, a next picture may be acquired from the video sequence. The next picture may be taken as the current picture, and the flow may continue at computing the first rate distortion cost and the second rate distortion cost. Otherwise if the first rate distortion cost is less than the second rate distortion cost, it may be determined that the value of the first luma syntax element identification information is 1, which means that the luma component of the current picture is filtered by using a luma in-loop filtering network model, in which case the flow is to continue at determining whether the luma component of the current block in the current picture is filtered by using a luma in-loop filtering network model. That is, the third rate distortion cost may be compared to the fourth rate distortion cost. If the third rate distortion cost is less than the fourth rate distortion cost, it may be determined that the value of the second luma syntax element identification information is 1, which means that the luma component of the current block is to be filtered by using a luma in-loop filtering network model. Otherwise if the third rate distortion cost is greater than or equal to the fourth rate distortion cost, it may be determined that the value of the second luma syntax element identification information is 0, which means that the luma component of the current block is not to be filtered by using a luma in-loop filtering network model, in which case a next block in the current picture may be acquired, and the next block may be taken as the current block. The flow may continue to compute the third rate distortion cost and the fourth rate distortion cost.

In addition, for the luma component, in embodiments of the disclosure, a luma picture-level switch and a luma CTU-level switch may further be set. It may be determined whether filtering is performed using a luma in-loop filtering network model by controlling whether such a switch is on.

For the luma picture-level switch, in some embodiments, the method may further include an operation as follows. A luma picture-level switch may be set. The luma picture-level switch may be configured to control whether the luma component of the current picture is filtered by using a luma in-loop filtering network model.

Accordingly, the method may further include an operation as follows.

The luma picture-level switch may be turned on if the first rate distortion cost is less than the second rate distortion cost.

Alternatively, the luma picture-level switch may be turned off if the first rate distortion cost is greater than or equal to the second rate distortion cost.

For the luma CTU-level switch, in some embodiments, the method may further include an operation as follows. A luma CTU-level switch may be set. The luma CTU-level switch may be configured to control whether the luma component of the current block is filtered by using a luma in-loop filtering network model.

Accordingly, the method may further include an operation as follows.

The luma CTU-level switch may be turned on if the third rate distortion cost is less than the fourth rate distortion cost.

Alternatively, the luma CTU-level switch may be turned off if the third rate distortion cost is greater than or equal to the fourth rate distortion cost.

Note that the on/off state of both the luma picture-level switch and the luma CTU-level switch may be determined in a rate distortion cost mode. Here, in a possible implementation, the state may be determined according to a computed rate distortion cost.

In another possible implementation, the state of the luma picture-level switch may still be determined according to $RDcost=D+\lambda*R$. Here, D may denote a distortion reduction achieved through filtering the current picture by using a luma in-loop filtering network model. $D=D_{out}-D_{rec}$. $D_{out}$ may be a distortion output by the luma in-loop filtering network model. $D_{rec}$ may be a distortion before the processing by the luma in-loop filtering network model. R may be the number of blocks included in the current picture. $\lambda$ may be kept the same as $\lambda$ of the ALF. In this case, when RDcost is negative, the luma picture-level switch may be turned on; that is, a picture-level luma in-loop filtering network model may be enabled. Otherwise if RDcost is not less than 0, the luma picture-level switch may be turned off, that is, the picture-level luma in-loop filtering network model may be disabled.

When a luma picture-level switch is on, the state of a luma CTU-level switch may be determined according to $RDcost=D$. Here, D may denote a distortion reduction achieved through filtering the current block by using a luma in-loop filtering network model. $D=D_{out}-D_{rec}$. $D_{out}$ may be a distortion output by the luma in-loop filtering network model. $D_{rec}$ may be a distortion before the processing by the luma in-loop filtering network model.

Thus, for S1103, in some embodiments, the current block may be filtered by using the in-loop filtering network model as follows. The current block may be filtered by using the luma in-loop filtering network model if the third rate distortion cost is less than the fourth rate distortion cost.

That is, two syntax elements are required for the luma component, i.e., a picture-level syntax element and a CTU-level syntax element. The current block is filtered by using a luma in-loop filtering network model just when the CTU-level syntax element (i.e., the second luma syntax element identification information) indicates that filtering the current block using a luma in-loop filtering network model is enabled, i.e., when the third rate distortion cost is less than the fourth rate distortion cost. Just in this case, model selection using a preset selection network model may be enabled for the current block. That is, the value of the first syntax element identification information has to be determined.

Further, after it has been determined that the video sequence is filtered by using an in-loop filtering network model, when the colour component type of the current picture is the chroma component, the in-loop filtering network model may be determined to be a chroma in-loop filtering network model. In this case, in another possible implementation, the method may further include operations as follows.

A fifth rate distortion cost of filtering a chroma component of the current picture using a chroma in-loop filtering network model may be determined. A sixth rate distortion cost of not filtering the chroma component of the current picture using the chroma in-loop filtering network model may be determined.

A value of chroma syntax element identification information may be determined to be the first value if the fifth rate distortion cost is less than the sixth rate distortion cost. Additionally or alternatively, the value of the chroma syntax element identification information may be determined to be the second value if the fifth rate distortion cost is greater than or equal to the sixth rate distortion cost.

The method may further include operations as follows. The value of the chroma syntax element identification information may be encoded, and an encoded bit may be signalled in a bitstream.

Note that a picture-level syntax element may be involved for the chroma component. The picture-level syntax element may be referred to as the chroma syntax element identification information. Assuming that the chroma syntax element identification information is a flag information, the chroma syntax element identification information may be denoted by chroma_picture_flag.

Further note that the first value may be set as 1, and the second value may be set as 0. Alternatively, the first value may further be set as true, and the second value may further be set as false. Alternatively, the first value may further be set as 0, and the second value may further be set as 1. Alternatively, the first value may further be set as false, and the second value may further be set as true. Illustratively, in general, the first value may be 1, and the second value may be 0, which however is not limited in any way.

Further, given coding performance and computational complexity, if the chroma syntax element identification information indicates that the chroma component of the current picture is filtered by using a chroma in-loop filtering network model, then by default each block included in the current picture is filtered by using a chroma in-loop filtering network model. If the chroma syntax element identification information indicates that the chroma component of the current picture is not filtered by using a chroma in-loop filtering network model, then by default each block included in the current picture is not filtered by using a chroma in-loop filtering network model. Therefore, no CTU-level syntax element has to be set for the chroma component. Similarly, no CTU-level switch has to be set for the chroma component.

In other words, in embodiments of the disclosure, just a picture-level switch may be set for the chroma component. Therefore, in some embodiments, the method may further include an operation of setting a chroma picture-level switch. The chroma picture-level switch may be configured to control whether the chroma component of the current picture is filtered by using a chroma in-loop filtering network model.

Accordingly, the method may further include an operation as follows.

The chroma picture-level switch may be turned on if the fifth rate distortion cost is less than the sixth rate distortion cost.

Alternatively, the chroma picture-level switch may be turned off if the fifth rate distortion cost is greater than or equal to the sixth rate distortion cost.

Note that for the fifth rate distortion cost and the sixth rate distortion cost, in a specific example, a distortion value may also be determined according to a mean-square error. The other computation is the same as in computing the first rate distortion cost and the second rate distortion cost, which is not elaborated here. In addition, the on/off state of the chroma picture-level switch may be determined in a mode similar as that for determining the on/off state of the luma picture-level switch, which is not elaborated here.

Thus, for example, the first value is 1, and the second value is 0. After the fifth rate distortion cost and the sixth rate distortion cost have been acquired, the fifth rate distortion cost may be compared to the sixth rate distortion cost. If the fifth rate distortion cost is less than the sixth rate distortion cost, the chroma picture-level switch may be turned on, and it may further be determined that the value of the chroma syntax element identification information is 1, which means that the chroma component of the current picture is to be filtered by using a chroma in-loop filtering network model. After the current picture has been processed, the flow may continue to load and process a next picture. Otherwise if the fifth rate distortion cost is greater than or equal to the sixth rate distortion cost, the chroma picture-level switch may be turned off, and it may further be determined that the value of the chroma syntax element identification information is 0, which means that the chroma component of the current picture does not have to be filtered by using a chroma in-loop filtering network model. In this case, a next picture may be acquired from the video sequence. The next picture may be taken as the current picture, and the flow may continue to load and process the next picture, to determine the value of a syntax element identification information of the next picture.

Thus, for S1103, in some embodiments, the current block may be filtered by using the in-loop filtering network model as follows. The current block may be filtered by using the chroma in-loop filtering network model if the fifth rate distortion cost is less than the sixth rate distortion cost.

That is, just one syntax element, i.e., a picture-level syntax element, may be required for the chroma component. The current block is filtered by using a chroma in-loop filtering network model just when the picture-level syntax element (i.e., the chroma syntax element identification information) indicates that filtering the current block using a chroma in-loop filtering network model is enabled, i.e., when the third rate distortion cost is less than the fourth rate distortion cost.

In addition, an in-loop filtering network model according to embodiments of the disclosure may be a convolutional neural network based in-loop filter (CNNLF) model. Thus, if the current block is to be filtered by using a CNNLF model, the reconstructed picture block of the current block may be acquired by performing CNNLF filtering on the current block using a selected CNNLF model.

In short, use of a CNNLF model may include two stages, i.e, offline training, and inference/test. In offline training, a total of 16 models, including 4 I-frame luma component models, 4 non-I-frame luma component models, 4 chroma U component models, and 4 chroma V component models, may be trained offline. Specifically, a preset picture data set (such as DIV2K, which has 1000 high-definition pictures of a 2K resolution) is used. Of the 1000 pictures, 800 pictures may be used in training, 100 pictures may be used for verification, and 100 pictures may be used in test. The pictures may be converted from RGB pictures into a single-picture video sequence of a YUV4:2:0 format, serving as label data. Then, the sequence may be encoded with an all intra configuration using an HPM. A conventional filter such as the DBF, the SAO, the ALF, etc., may be disabled. A quantization step of 27 to 50 may be set. A reconstructed sequence acquired by coding may be partitioned into 128× 128 picture blocks according to 4 QP partition ranges 27~31, 32~37, 38~44, and 45~50. 4 I-frame luma component models, 4 chroma U component models, and 4 chroma V component models may be trained, respectively, taking the picture blocks as training data. Further, a preset video data set (such as BVI-DVC) may be encoded with a random access configuration using an HPM-ModAI. A conventional filter such as the DBF, the SAO, the ALF, etc., may be disabled. A CNNLF model for an I-frame may be enabled. Encoded reconstructed non-I-frame data may be collected, and 4 non-I-frame luma component models may be trained, respectively.

In inference/test, with an HPM-ModAI, a picture-level switch and a CTU-level switch may be set for the luma component to control whether to call a CNNLF model, and a picture-level switch may be set for the chroma component to control whether to call a CNNLF model. Here, a switch in general may be denoted by a flag. In addition, a picture-level switch may be determined by a formula (1). $D=D_{net}-D_{rec}$ may denote a distortion reduction achieved by CNNLF processing. $D_{net}$ may be a distortion output by filtering. $D_{rec}$ may be a distortion before filtering. R may denote the number of CTUs in the current picture. $\lambda$ may be kept the same as $\lambda$ of the ALF. When RDcost is negative, the picture-level switch may be turned on. Otherwise the picture-level switch may be turned off when RDcost is not less than 0.

$$RDcost=D+\lambda*R \qquad (1)$$

When a picture-level switch is on, it is further to be decided, in a rate distortion cost mode, whether a CTU-level switch for a CTU is on. Here, the CTU-level switch may be set to control whether to call a CNNLF model. Specifically, the CTU-level switch may be determined by a formula (2).

$$RDcost=D \qquad (2)$$

That is, after it has been determined whether model selection using a preset selection network model is enabled for the current block, the encoder may determine, in a rate distortion cost mode, whether the current picture or the current block is to be filtered by using a CNNLF model, so as to determine the reconstructed picture block of the current block.

Further, the input reconstructed picture block (including an input reconstructed luma picture block or an input reconstructed chroma picture block) may be acquired through filtering using a deblocking filter (DBF) and a sample adaptive offset (SAO) filter.

In some embodiments, the method may further include an operation as follows. After the reconstructed picture block of the current block has been determined, the reconstructed picture block may be further filtered by using an adaptive loop filter (ALF).

Taking FIG. 9 as an example, the input reconstructed picture block may be acquired through filtering using the deblocking filter (DBF) and the sample adaptive offset (SAO) filter. Then, the reconstructed picture block acquired using the MAS module and the CNNLF model may be further filtered by being input to the ALF.

Besides, in embodiments of the disclosure, each of the number of convolution layers, the number of fully connected layers, the nonlinear activation function, etc., included in the first neural network structure, the second neural network structure, the third neural network structure, etc., in foregoing embodiments may be adjusted. In addition, the MAS module may adaptively select an in-loop filtering network model such as a CNNLF model, another efficient neural network filter model, etc., which is not limited in any way here.

In short, embodiments of the disclosure propose a model adaptive selection (MAS) module based on deep learning, configured to adaptively select a CNNLF model, improving coding performance. The MAS module may be deemed as a preset selection network model consisting of multiple CNN layers and multiple fully connected neural network layers. An input reconstructed picture block to be input to a CNNLF model may be input to the MAS module, outputting the probability distribution of each CNNLF model. The MAS module may be located at a location in the encoder/decoder as illustrated in FIG. 5. Use of the MAS module does not depend on any switch of the DBF, the SAO, the ALF, and the CNNLF. It is just that the MAS module is located before the CNNLF.

In a specific example, a technical solution according to embodiments of the disclosure is implemented in the in-loop filtering module of the encoder, with a specific flow as follows.

When entering the in-loop filtering module at the encoder end, the flow may be processed according to a preset filter order. Here, the preset filter order may be DBF filtering→SAO filtering→MAS module→CNNLF filtering→ALF filtering. The flow may be as follows when entering the MAS module.

(a) First, it may be determined according to model_adaptive_selection_enable_flag whether model selection using the MAS module is enabled for the current block. If model_adaptive_selection_enable_flag is 1, MAS module processing may be attempted for the current block, and the flow may go to (b). If model_adaptive_selection_enable_flag is 0, the flow may go to (e).

(b) The colour component type of the current block may be determined. The flow may go to (c) if the current block is a luma component block. The flow may go to (d) if the current block is a chroma component block.

(c) For the luma component, the input reconstructed luma picture block to be input to a CNNLF model may be input to the MAS module, outputting the probability distribution of each luma CNNLF model. A luma CNNLF model having the maximum probability value thereof may be selected as the CNNLF model used to filter the current luma picture block, and CNNLF filtering may be performed on the current luma picture block, acquiring the final reconstructed picture block.

(d) For the chroma component, the input reconstructed chroma picture block to be input to a CNNLF model may be input to the MAS module, outputting the probability distribution of each chroma CNNLF model. A chroma CNNLF model having the maximum probability value thereof may be selected as the CNNLF model used to filter the current chroma picture block, and CNNLF filtering may be performed on the current chroma picture block, acquiring the final reconstructed picture block.

(e) Once decision-making at the MAS module for the current picture completes, the next picture may be loaded and processed. Then, the flow may go to (a).

In a more specific example, syntax element modification is as illustrated in Table 1.

The embodiment provides an encoding method, implemented by an encoder. A value of first syntax element identification information is determined. When the first syntax element identification information indicates that model selection using a preset selection network model is enabled for a current block, the preset selection network model for the current block is determined, and an in-loop filtering network model used to filter the current block is determined according to the preset selection network model. A reconstructed picture block of the current block is acquired through filtering the current block by using the in-loop filtering network model. In this way, model adaptive selection based on deep learning is introduced. An in-loop filtering network model is selected from at least one candidate in-loop filtering network model using a preset selection network model, and then a current block is filtered according to the selected in-loop filtering network model, not only improving coding performance, thereby improving encoding and decoding efficiencies, but also leading to a final output reconstructed picture block closer to an original picture block, improving quality of a video picture.

Yet another embodiment of the disclosure provides a bitstream. The bitstream is generated by performing bit coding on to-be-encoded information. The to-be-encoded information includes at least one of a value of first syntax element identification information, a value of second syntax element identification information, a value of first luma syntax element identification information, a value of second luma syntax element identification information, or a value of chroma syntax element identification information.

In embodiments of the disclosure, a video sequence includes a current picture. The current picture includes a current block. The first syntax element identification information indicates whether model selection using a preset selection network model is enabled for the current block. The second syntax element identification information indicates whether the video sequence is filtered by using an in-loop filtering network model. The first luma syntax element identification information indicates whether a luma component of the current picture is filtered by using a luma in-loop filtering network model. The second luma syntax element identification information indicates whether a luma component of the current block is filtered by using the luma in-loop filtering network model. The chroma syntax element identification information indicates whether a chroma component of the current picture is filtered by using a chroma in-loop filtering network model.

Figure 12:
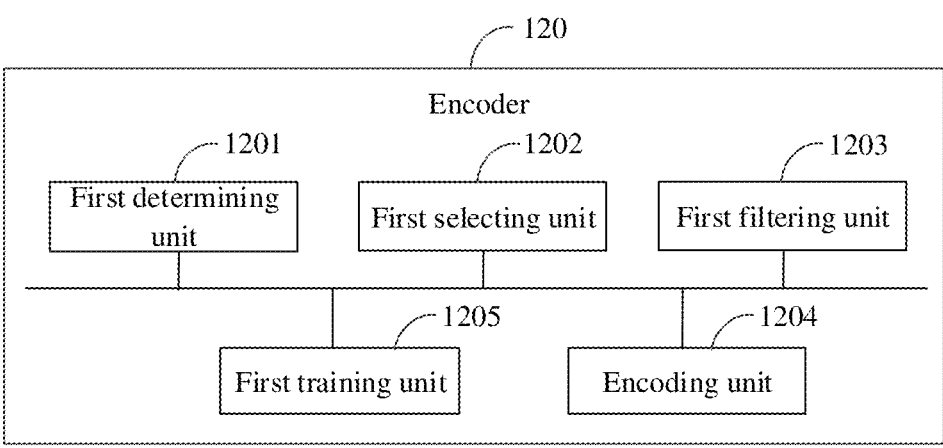
FIG. 12 is a diagram of a compositional structure of an encoder according to embodiments of the disclosure.

In yet another embodiment of the disclosure, based on an inventive concept same as that of a foregoing embodiment, FIG. 12 is a diagram of a structure of an encoder 120 according to embodiments of the disclosure. As illustrated in FIG. 12, the encoder 120 may include a first determining unit 1201, a first selecting unit 1202, and a first filtering unit 1203.

The first determining unit 1201 is configured to determine a value of first syntax element identification information.

The first selecting unit 1202 is configured to, in response to the first syntax element identification information indicating that model selection using a preset selection network model is enabled for a current block, determine the preset selection network model for the current block, and determine an in-loop filtering network model used to filter the current block according to the preset selection network model.

The first filtering unit 1203 is configured to acquire a reconstructed picture block of the current block through filtering the current block by using the in-loop filtering network model.

In some embodiments, the first selecting unit 1202 may further be configured to determine an output value corresponding to each candidate in-loop filtering network model of at least one candidate in-loop filtering network model according to the preset selection network model, and determine the in-loop filtering network model used to filter the current block according to the output value corresponding to each of the at least one candidate in-loop filtering network model.

In some embodiments, the first selecting unit 1202 may further be configured to determine an input reconstructed picture block to be input to the in-loop filtering network model, and acquire the output value corresponding to each of the at least one candidate in-loop filtering network model by inputting the input reconstructed picture block to the preset selection network model.

In some embodiments, the first selecting unit 1202 may further be configured to determine a target value from the output value corresponding to each of the at least one candidate in-loop filtering network model, and take a candidate in-loop filtering network model corresponding to the target value as the in-loop filtering network model used to filter the current block.

In some embodiments, the first selecting unit 1202 may further be configured to select a maximum value of the output value corresponding to each of the at least one candidate in-loop filtering network model, and take the maximum value as the target value.

In some embodiments, referring to FIG. 12, the encoder 120 may further include an encoding unit 1204.

The first determining unit 1201 may further be configured to determine an index number of an in-loop filtering network model corresponding to the in-loop filtering network model.

The encoding unit 1204 may further be configured to encode the index number of the in-loop filtering network model, and signal an encoded bit in a bitstream.

In some embodiments, the first determining unit 1201 may further be configured to determine the value of the first syntax element identification information to be a first value in response to model selection using the preset selection network model being enabled for the current block, or determine the value of the first syntax element identification information to be a second value in response to model selection using the preset selection network model being disabled for the current block.

In some embodiments, the encoding unit 1204 may further be configured to encode the value of the first syntax element identification information, and signal an encoded bit in a bitstream.

In some embodiments, a video sequence includes a current picture. The current picture includes the current block. Accordingly, the first determining unit 1201 may further be configured to determine a value of second syntax element identification information to be a first value in response to determining that the video sequence is filtered by using the in-loop filtering network model, or determine the value of the second syntax element identification information to be a second value in response to determining that the video sequence is not filtered by using the in-loop filtering network model.

In some embodiments, the encoding unit 1204 may further be configured to encode the value of the second syntax element identification information, and signal an encoded bit in a bitstream.

In some embodiments, the first determining unit 1201 may further be configured to determine a first rate distortion cost of filtering a luma component of the current picture using a luma in-loop filtering network model, determine a second rate distortion cost of not filtering the luma component of the current picture using the luma in-loop filtering network model, determine a value of first luma syntax element identification information to be the first value in response to the first rate distortion cost being less than the second rate distortion cost, and/or determine the value of the first luma syntax element identification information to be the second value in response to the first rate distortion cost being greater than or equal to the second rate distortion cost.

In some embodiments, the encoding unit 1204 may further be configured to encode the value of the first luma syntax element identification information, and signal an encoded bit in a bitstream.

In some embodiments, the first determining unit 1201 may further be configured to, in response to the first rate distortion cost being less than the second rate distortion cost, determine a third rate distortion cost of filtering a luma component of the current block using the luma in-loop filtering network model, and determine a fourth rate distortion cost of not filtering the luma component of the current block using the luma in-loop filtering network model; determine a value of second luma syntax element identification information to be the first value in response to the third rate distortion cost being less than the fourth rate distortion cost; and/or determine the value of the second luma syntax element identification information to be the second value in response to the third rate distortion cost being greater than or equal to the fourth rate distortion cost.

In some embodiments, the encoding unit 1204 may further be configured to encode the value of the second luma syntax element identification information, and signal an encoded bit in a bitstream.

In some embodiments, the first determining unit 1201 may further be configured to filter the current block using the luma in-loop filtering network model in response to the third rate distortion cost being less than the fourth rate distortion cost.

In some embodiments, the first determining unit 1201 may further be configured to, in response to the colour component type of the current picture being the chroma component, determine a fifth rate distortion cost of filtering a chroma component of the current picture using a chroma in-loop filtering network model, and determine a sixth rate distortion cost of not filtering the chroma component of the current picture using the chroma in-loop filtering network model; determine a value of chroma syntax element identification information being the first value in response to the fifth rate distortion cost being less than the sixth rate distortion cost; and/or determine the value of the chroma syntax element identification information being the second value in response to the fifth rate distortion cost being greater than or equal to the sixth rate distortion cost.

In some embodiments, the encoding unit 1204 may further be configured to encode the value of the chroma syntax element identification information, and signal an encoded bit in a bitstream.

In some embodiments, the first determining unit 1201 may further be configured to filter the current block using the chroma in-loop filtering network model in response to the fifth rate distortion cost being less than the sixth rate distortion cost.

In some embodiments, the first determining unit 1201 may further be configured to determine a luma selection network model for the current block in response to a colour component type of the current block being a luma component, and determine a chroma selection network model for the current block in response to the colour component type of the current block being a chroma component.

Accordingly, the first determining unit 1201 may further be configured to determine an output value corresponding to each candidate luma in-loop filtering network model of at least one candidate luma in-loop filtering network model according to the luma selection network model in response to the colour component type of the current block being the luma component, and determine an output value corresponding to each candidate chroma in-loop filtering network model of at least one candidate chroma in-loop filtering network model according to the chroma selection network model in response to the colour component type of the current block being the chroma component.

In some embodiments, referring to FIG. 12, the encoder 120 may further include a first training unit 1205.

In some embodiments, the first determining unit 1201 may further be configured to determine a first training set. The first training set may include at least one training sample. The at least one training sample may be acquired according to at least one type of quantization parameter (QP).

The first training unit 1205 may be configured to acquire the at least one candidate luma in-loop filtering network model by training a first neural network structure using a luma component of the at least one training sample in the first training set.

In some embodiments, the first neural network structure includes a first convolution module, a first residual module, a second convolution module, and a first connected module. The first convolution module, the first residual module, the second convolution module, and the first connected module may be connected in sequence. The first connected module may further be connected with an input of the first convolution module.

In some embodiments, the first convolution module consists of one convolution layer and one activation layer, the second convolution module consists of two convolution layers and one activation layer, the first connected module consists of a concatenation layer, and the first residual module includes several residual blocks. Each residual block may consist of two convolution layers and one activation layer.

In some embodiments, the first determining unit 1201 may further be configured to determine a first training set.

The first training set may include at least one training sample. The at least one training sample may be acquired according to at least one type of quantization parameter (QP).

The first training unit 1205 may further be configured to acquire the at least one candidate chroma in-loop filtering network model by training a second neural network structure using a luma component and a chroma component of the at least one training sample in the first training set.

In some embodiments, the second neural network structure includes an up-sampling module, a third convolution module, a fourth convolution module, a fusion module, a second residual module, a fifth convolution module, and a second connected module. The up-sampling module may be connected with the third convolution module. The third convolution module and the fourth convolution module may be connected with the fusion module. The fusion module, the second residual module, the fifth convolution module, and the second connected module may be connected in sequence. The second connected module may further be connected with an input of the up-sampling module.

In some embodiments, the third convolution module consists of one convolution layer and one activation layer, the fourth convolution module consists of one convolution layer and one activation layer, the fifth convolution module consists of two convolution layers, one activation layer, and one pooling layer, the second connected module consists of a concatenation layer, and the second residual module includes several residual blocks. Each residual block may consist of two convolution layers and one activation layer.

In some embodiments, the first selecting unit 1202 may further be configured to determine at least one candidate luma selection network model in response to the colour component type of the current block being the luma component, determine a quantization parameter (QP) of the current block, and select a candidate luma selection network model corresponding to the QP from the at least one candidate luma selection network model.

The first determining unit 1201 may further be configured to take the candidate luma selection network model as the luma selection network model for the current block.

In some embodiments, the first selecting unit 1202 may further be configured to determine at least one candidate chroma selection network model in response to the colour component type of the current block being the chroma component, determine a quantization parameter (QP) of the current block, and select a candidate chroma selection network model corresponding to the QP from the at least one candidate chroma selection network model.

The first determining unit 1201 may further be configured to take the candidate chroma selection network model as the chroma selection network model for the current block.

In some embodiments, the first determining unit 1201 may further be configured to determine a second training set. The second training set may include at least one training sample. The at least one training sample may be acquired according to at least one type of quantization parameter (QP).

The first training unit 1205 may further be configured to acquire the at least one candidate luma selection network model by training a third neural network structure using a luma component of the at least one training sample in the second training set, and acquire the at least one candidate chroma selection network model by training the third neural network structure using a chroma component of the at least one training sample in the second training set. The at least one candidate luma selection network model may correspond to the luma component and the QP. The at least one candidate chroma selection network model may correspond to the chroma component and the QP.

In some embodiments, the third neural network structure includes a sixth convolution module and a fully connected module. The sixth convolution module and the fully connected module may be connected in sequence. The sixth convolution module may include several convolution submodules. A convolution sub-module may consist of one convolution layer and one pooling layer. The fully connected module may include several fully connected sub-modules. A fully connected sub-module may consist of one fully connected layer and one activation layer.

In some embodiments, the first determining unit 1201 may further be configured to determine an input reconstructed luma picture block to be input to a luma in-loop filtering network model in response to the colour component type of the current block being the luma component, acquire the output value corresponding to the each candidate luma in-loop filtering network model of the at least one candidate luma in-loop filtering network model by inputting the input reconstructed luma picture block to the luma selection network model, determine a target value from the output value corresponding to the each candidate luma in-loop filtering network model of the at least one candidate luma in-loop filtering network model, and take a candidate luma in-loop filtering network model corresponding to the target value as the luma in-loop filtering network model used to filter the current block; or determine an input reconstructed chroma picture block to be input to a chroma in-loop filtering network model in response to the colour component type of the current block being the chroma component, acquire the output value corresponding to the each candidate chroma in-loop filtering network model of the at least one candidate chroma in-loop filtering network model by inputting the input reconstructed chroma picture block to the chroma selection network model, determine a target value from the output value corresponding to the each candidate chroma in-loop filtering network model of the at least one candidate chroma in-loop filtering network model, and take a candidate chroma in-loop filtering network model corresponding to the target value as the chroma in-loop filtering network model used to filter the current block.

In some embodiments, the in-loop filtering network model is a convolutional neural network based in-loop filter (CNNLF) model.

In some embodiments, the input reconstructed picture block is acquired through filtering using a deblocking filter (DBF) and a sample adaptive offset (SAO) filter.

In some embodiments, the first filtering unit 1203 may further be configured to filter the reconstructed picture block using an adaptive loop filter (ALF) after the reconstructed picture block has been determined.

Understandably, in embodiments of the disclosure, a "unit" may be a part of a circuit, a part of a processor, a part of a program or software, etc. Of course, a unit may be a module, or may be non-modularized. In addition, components in the embodiments may be integrated in one processing unit, or exist as separate physical units respectively. Alternatively, two or more units may be integrated in one unit. The integrated unit may be implemented in form of hardware or software functional module(s). When implemented in form of a software functional module and sold or used as an independent product, an integrated unit herein may be stored in a computer-readable storage medium. Based on such an understanding, the essential part of the technical solution of the embodiments or a part contributing to prior art or all or part of the technical solution may appear in form of a software product. The computer software product is stored in storage media, and includes several instructions for allowing computer equipment (such as a personal computer, a server, network equipment, and/or the like) or a processor to execute all or part of the steps of the methods of the embodiments. The storage media include various media that can store program codes, such as a U disk, a mobile hard disk, read only memory (ROM), random access memory (RAM), a magnetic disk, a CD, and/or the like.

Therefore, embodiments of the disclosure provide a computer storage medium, implemented at an encoder 120. The computer storage medium has stored thereon a computer program. When executed by a first processor, the computer program implements the method according to any one of the foregoing embodiments.

Figure 13:
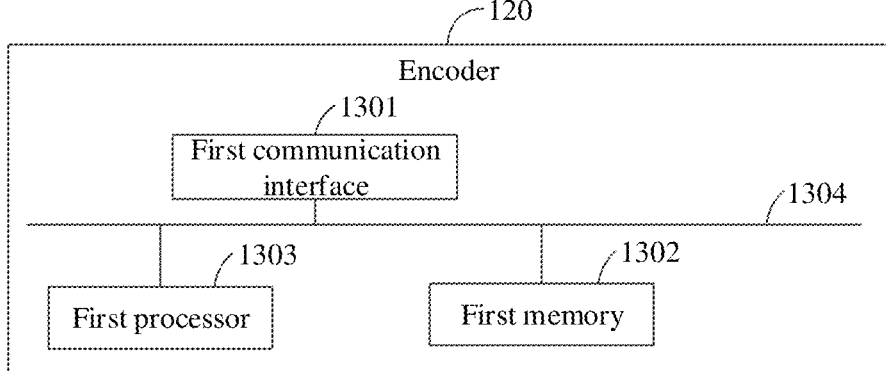
FIG. 13 is a diagram of a specific hardware structure of an encoder according to embodiments of the disclosure.

Based on composition of the encoder 120 and the computer storage medium, FIG. 13 is a diagram of a specific hardware structure of an encoder according to embodiments of the disclosure. As illustrated in FIG. 13, the encoder may include a first communication interface 1301, a first memory 1302, and a first processor 1303. Various components may be coupled together through a first bus system 1304. Understandably, the first bus system 1304 is configured to implement connection and communication among these components. In addition to a data bus, the first bus system 1304 may further include a power bus, a control bus, and a status signal bus. However, for clarity of description, various buses are marked as the first bus system 1304 in FIG. 13.

The first communication interface 1301 may be configured to perform signal sending and receiving while performing information sending and receiving with another external network element.

The first memory 1302 may be configured to store a computer program executabe on the first processor 1303.

The first processor 1303 may be configured to execute the computer program to implement:

determining a value of first syntax element identification information;

in response to the first syntax element identification information indicating that model selection using a preset selection network model is enabled for a current block, determining the preset selection network model for the current block, and determining an in-loop filtering network model used to filter the current block according to the preset selection network model; and acquiring a reconstructed picture block of the current block through filtering the current block by using the in-loop filtering network model.

Understandably, the first memory 1302 according to embodiments of the disclosure may be a volatile and/or a non-volatile memory. The non-volatile memory may be a read only memory (ROM), a programmable ROM (PROM), an erasable PROM (EPROM), an electrically EPROM (EEPROM), or a flash memory. The volatile memory may be a random access memory (RAM) serving as an external cache. By way of illustrative instead of restrictive description, there may be many forms of RAM available, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SL-DRAM), a direct rambus RAM (DRRAM), etc. The first memory 1302 of a system and a method according to the disclosure is intended to include, but is not limited to, these and any other memory of suitable types.

The first processor 1303 may be an integrated circuit chip capable of signal processing. In implementation, a step of a method herein may be carried out via an integrated logic circuit of hardware in the first processor 1303 or instructions in form of software. The first processor 1303 may be a general-purpose processor, a digital signal processor (DSP), an application specific integrated circuit (ASIC), a field programmable gate array (FPGA), or another programmable logic device, a discrete gate, or a transistor logic device, a discrete hardware component, etc. The processor may implement or execute various methods, steps, and logical block diagrams according to embodiments of the disclosure. A general-purpose processor may be a microprocessor or any conventional processor. A step of the method disclosed in embodiments of the disclosure may be directly embodied as being carried out by a hardware decoding processor, or by a combination of hardware and software modules in the decoding processor. A software module may be located in a mature storage medium in the art, such as a random access memory (RAM), a flash memory, a read only memory (ROM), a programmable read-only memory (PROM), an electrically rewritable programmable memory, a register, etc. The storage medium may be located in the first memory 1302. The first processor 1303 may read information in the first memory 1302, and combine it with hardware of the first processor to perform a step of a method herein.

Understandably, the embodiments according to the disclosure may be implemented by hardware, software, firmware, middleware, a microcode, or a combination of the any listed item. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, micro controller units (MCU), microprocessors, and other electronic units for implementing the function of the disclosure, or a combination thereof. For software implementation, technology according to the disclosure may be implemented by a module, such as a process, a function, etc., that implements the function of the disclosure. A software code may be stored in the memory and executed by the processor. The memory may be implemented internal or external to the processor.

Optionally, as another embodiment, the first processor 1303 may further be configured to execute the computer program to implement the method according to any one of the foregoing embodiments.

The embodiment provides an encoder. The encoder may include a first determining unit, a first selecting unit, and a first filtering unit. In this way, model adaptive selection based on deep learning is introduced, not only improving coding performance, thereby improving encoding and decoding efficiencies, but also leading to a final output reconstructed picture block closer to an original picture block, improving quality of a video picture.

Figure 14:
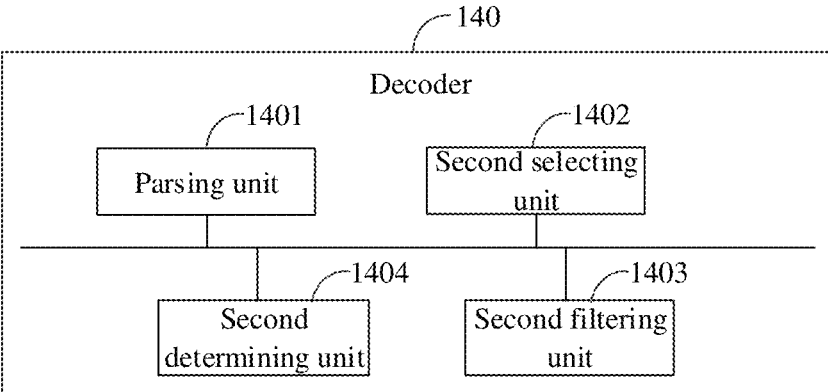
FIG. 14 is a diagram of a compositional structure of a decoder according to embodiments of the disclosure.

In yet another embodiment of the disclosure, based on an inventive concept same as that of a foregoing embodiment, FIG. 14 is a diagram of a structure of a decoder 140 according to embodiments of the disclosure. As illustrated in FIG. 14, the decoder 140 may include a parsing unit 1401, a second selecting unit 1402, and a second filtering unit 1403.

The parsing unit 1401 is configured to parse a bitstream and determine a value of first syntax element identification information.

The second selecting unit 1402 is configured to, in response to the first syntax element identification information indicating that model selection using a preset selection network model is enabled for a current block, determine the preset selection network model for the current block, and determine an in-loop filtering network model used to filter the current block according to the preset selection network model.

The second filtering unit 1403 is configured to acquire a reconstructed picture block of the current block through filtering the current block by using the in-loop filtering network model.

In some embodiments, the second selecting unit 1402 may further be configured to determine an output value corresponding to each candidate in-loop filtering network model of at least one candidate in-loop filtering network model according to the preset selection network model, and determine the in-loop filtering network model used to filter the current block according to the output value corresponding to each of the at least one candidate in-loop filtering network model.

In some embodiments, referring to FIG. 14, the decoder 140 may further include a second determining unit 1404 configured to determine an input reconstructed picture block to be input to the in-loop filtering network model.

The second selecting unit 1402 may further be configured to acquire the output value corresponding to each of the at least one candidate in-loop filtering network model by inputting the input reconstructed picture block to the preset selection network model.

In some embodiments, the second determining unit 1404 may further be configured to determine a target value from the output value corresponding to each of the at least one candidate in-loop filtering network model, and take a candidate in-loop filtering network model corresponding to the target value as the in-loop filtering network model used to filter the current block.

In some embodiments, the second determining unit 1404 may further be configured to select a maximum value of the output value corresponding to each of the at least one candidate in-loop filtering network model, and take the maximum value as the target value.

In some embodiments, the second determining unit 1404 may further be configured to, in response to the first syntax element identification information being a first value, determine that the first syntax element identification information indicates that model selection using the preset selection network model is enabled for the current block; or in response to the first syntax element identification information being a second value, determine that the first syntax element identification information indicates that model selection using the preset selection network model is disabled for the current block.

In some embodiments, the parsing unit 1401 may further be configured to determine a value of second syntax element identification information by parsing the bitstream, and in response to the second syntax element identification information indicating that a video sequence is filtered by using the in-loop filtering network model, determine a value of a third syntax element identification information by parsing the bitstream. The third syntax element identification information may be configured to indicate whether a current picture in the video sequence is filtered by using the in-loop filtering network model. The current picture may include the current block.

In some embodiments, the second determining unit 1404 may further be configured to, in response to the second syntax element identification information being a first value, determine that the second syntax element identification information indicates that the video sequence is filtered by using the in-loop filtering network model; or in response to the second syntax element identification information being a second value, determine that the second syntax element identification information indicates that the video sequence is not filtered by using the in-loop filtering network model.

In some embodiments, the parsing unit 1401 may further be configured to acquire first luma syntax element identification information corresponding to a luma component of the current picture by parsing the bitstream. The first luma syntax element identification information may be configured to indicate whether the luma component of the current picture is filtered by using a luma in-loop filtering network model. Alternatively, the parsing unit may further be configured to acquire chroma syntax element identification information corresponding to a chroma component of the current picture by parsing the bitstream. The chroma syntax element identification information may be configured to indicate whether the chroma component of the current picture is filtered by using a chroma in-loop filtering network model.

In some embodiments, the parsing unit 1401 may further be configured to determine a value of second luma syntax element identification information by parsing the bitstream in response to the first luma syntax element identification information indicating that the luma component of the current picture is filtered by using the luma in-loop filtering network model, and determine the value of the first syntax element identification information by parsing the bitstream in response to the second luma syntax element identification information indicating that a luma component of the current block is filtered by using the luma in-loop filtering network model.

In some embodiments, the second determining unit 1404 may further be configured to, in response to the value of the first luma syntax element identification information being the first value, determine that the first luma syntax element identification information indicates that the luma component of the current picture is filtered by using the luma in-loop filtering network model; or in response to the value of the first luma syntax element identification information being the second value, determine that the first luma syntax element identification information indicates that the luma component of the current picture is not filtered by using the luma in-loop filtering network model.

In some embodiments, the second determining unit 1404 may further be configured to, in response to the value of the second luma syntax element identification information being the first value, determine that the second luma syntax element identification information indicates that the luma component of the current block is filtered by using the luma in-loop filtering network model; or in response to the value of the second luma syntax element identification information being the second value, determine that the second luma syntax element identification information indicates that the luma component of the current block is not filtered by using the luma in-loop filtering network model.

In some embodiments, for the chroma component of the current picture, the parsing unit 1401 may further be configured to determine the value of the first syntax element identification information by parsing the bitstream in response to the chroma syntax element identification information indicating that the chroma component of the current picture is filtered by using the chroma in-loop filtering network model.

In some embodiments, the second determining unit 1404 may further be configured to, in response to the value of the chroma syntax element identification information being the first value, determine that the chroma syntax element identification information indicates that the chroma component of the current picture is filtered by using the chroma in-loop filtering network model; or in response to the value of the chroma syntax element identification information being the second value, determine that the chroma syntax element identification information indicates that the chroma component of the current picture is not filtered by using the chroma in-loop filtering network model.

In some embodiments, the second determining unit 1404 may further be configured to determine a luma selection network model for the current block in response to a colour component type of the current block being a luma component, and determine a chroma selection network model for the current block in response to the colour component type of the current block being a chroma component.

Accordingly, the second determining unit 1404 may further be configured to determine an output value corresponding to each candidate luma in-loop filtering network model of at least one candidate luma in-loop filtering network model according to the luma selection network model in response to the colour component type of the current block being the luma component, and determine an output value corresponding to each candidate chroma in-loop filtering network model of at least one candidate chroma in-loop filtering network model according to the chroma selection network model in response to the colour component type of the current block being the chroma component.

In some embodiments, the at least one candidate luma in-loop filtering network model is determined by performing model training on a first neural network structure according to at least one training sample. The at least one candidate luma in-loop filtering network model may correspond to the colour component type and a quantization parameter (QP).

In some embodiments, the first neural network structure includes a first convolution module, a first residual module, a second convolution module, and a first connected module. The first convolution module, the first residual module, the second convolution module, and the first connected module may be connected in sequence. The first connected module may further be connected with an input of the first convolution module.

In some embodiments, the first convolution module consists of one convolution layer and one activation layer, the second convolution module consists of two convolution layers and one activation layer, the first connected module consists of a concatenation layer, and the first residual module includes several residual blocks. Each residual block may consist of two convolution layers and one activation layer.

In some embodiments, the at least one candidate chroma in-loop filtering network model is determined by performing model training on a second neural network structure according to at least one training sample. The at least one candidate chroma in-loop filtering network model may correspond to the colour component type and a quantization parameter (QP).

In some embodiments, the second neural network structure includes an up-sampling module, a third convolution module, a fourth convolution module, a fusion module, a second residual module, a fifth convolution module, and a second connected module. The up-sampling module may be connected with the third convolution module. The third convolution module and the fourth convolution module may be connected with the fusion module. The fusion module, the second residual module, the fifth convolution module, and the second connected module may be connected in sequence. The second connected module may further be connected with an input of the up-sampling module.

In some embodiments, the third convolution module consists of one convolution layer and one activation layer, the fourth convolution module consists of one convolution layer and one activation layer, the fifth convolution module consists of two convolution layers, one activation layer, and one pooling layer, the second connected module consists of a concatenation layer, and the second residual module includes several residual blocks. Each residual block may consist of two convolution layers and one activation layer.

In some embodiments, the second selecting unit 1402 may further be configured to determine at least one candidate luma selection network model in response to the colour component type of the current block being the luma component, determine a quantization parameter (QP) of the current block, and select a candidate luma selection network model corresponding to the QP from the at least one candidate luma selection network model.

The second determining unit 1404 may further be configured to take the candidate luma selection network model as the luma selection network model for the current block.

In some embodiments, the second selecting unit 1402 may further be configured to determine at least one candidate chroma selection network model in response to the colour component type of the current block being the chroma component, determine a quantization parameter (QP) of the current block, and select a candidate chroma selection network model corresponding to the QP from the at least one candidate chroma selection network model.

The second determining unit 1404 may further be configured to take the candidate chroma selection network model as the chroma selection network model for the current block.

In some embodiments, each of the at least one candidate luma selection network model or the at least one candidate chroma selection network model is determined by performing model training on a third neural network structure according to at least one training sample. Each of the at least one candidate luma selection network model or the at least one candidate chroma selection network model may correspond to the colour component type and the QP.

In some embodiments, the third neural network structure includes a sixth convolution module and a fully connected module. The sixth convolution module and the fully connected module may be connected in sequence. The sixth convolution module may include several convolution sub-modules. A convolution sub-module may consist of one convolution layer and one pooling layer. The fully connected module may include several fully connected sub-modules. A fully connected sub-module may consist of one fully connected layer and one activation layer.

In some embodiments, the second determining unit 1404 may further be configured to determine an input reconstructed luma picture block to be input to a luma in-loop filtering network model in response to the colour component type of the current block being the luma component, acquire the output value corresponding to the each candidate luma in-loop filtering network model of the at least one candidate luma in-loop filtering network model by inputting the input reconstructed luma picture block to the luma selection network model, determine a target value from the output value corresponding to the each candidate luma in-loop filtering network model of the at least one candidate luma in-loop filtering network model, and take a candidate luma in-loop filtering network model corresponding to the target value as the luma in-loop filtering network model used to filter the current block; or determine an input reconstructed chroma picture block to be input to a chroma in-loop filtering network model in response to the colour component type of the current block being the chroma component, acquire the output value corresponding to the each candidate chroma in-loop filtering network model of the at least one candidate chroma in-loop filtering network model by inputting the input reconstructed chroma picture block to the chroma selection network model, determine a target value from the output value corresponding to the each candidate chroma in-loop filtering network model of the at least one candidate chroma in-loop filtering network model, and take a candidate chroma in-loop filtering network model corresponding to the target value as the chroma in-loop filtering network model used to filter the current block.

In some embodiments, the parsing unit 1401 may further be configured to determine an index number of an in-loop filtering network model by parsing the bitstream in response to the first syntax element identification information indicating that model selection using the preset selection network model is enabled for the current block.

The second determining unit 1404 may further be configured to determine, from at least one candidate in-loop filtering network model according to the index number of the in-loop filtering network model, the in-loop filtering network model used to filter the current block.

The second filtering unit 1403 may further be configured to acquire the reconstructed picture block of the current block through filtering the current block by using the in-loop filtering network model.

In some embodiments, the in-loop filtering network model is a convolutional neural network based in-loop filter (CNNLF) model.

In some embodiments, the input reconstructed picture block is acquired through filtering using a deblocking filter (DBF) and a sample adaptive offset (SAO) filter.

In some embodiments, the second filtering unit 1403 may further be configured to filter the reconstructed picture block using an adaptive loop filter (ALF) after the reconstructed picture block has been determined.

Understandably, in the embodiment, a "unit" may be a part of a circuit, a part of a processor, a part of a program or software, etc. Of course, a unit may be a module, or may be non-modularized. In addition, components in the embodiments may be integrated in one processing unit, or exist as separate physical units respectively. Alternatively, two or more units may be integrated in one unit. The integrated unit may be implemented in form of hardware or software functional module(s). When implemented in form of a software functional module and sold or used as an independent product, an integrated unit herein may be stored in a computer-readable storage medium. Based on such an understanding, the embodiment provides a computer storage medium, implemented at a decoder 140. The computer storage medium has stored thereon a computer program. When executed by a second processor, the computer program implements the method according to any one of the foregoing embodiments.

Figure 15:
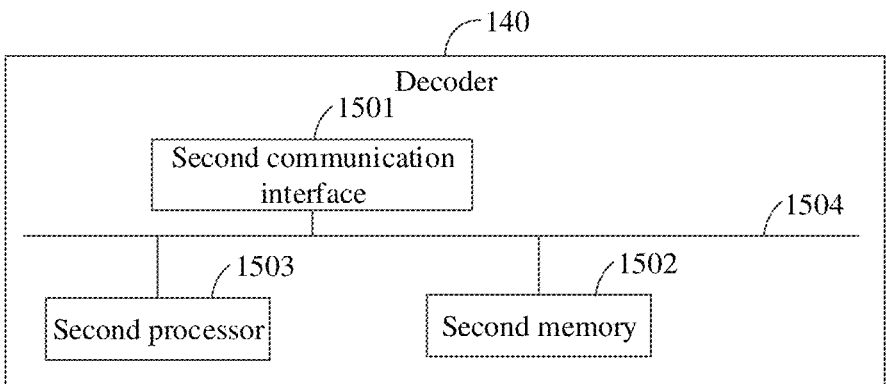
FIG. 15 is a diagram of a specific hardware structure of a decoder according to embodiments of the disclosure.

Based on composition of the decoder 140 and the computer storage medium, FIG. 15 is a diagram of a specific hardware structure of a decoder 140 according to embodiments of the disclosure. As illustrated in FIG. 15, the decoder may include a second communication interface 1501, a second memory 1502, and a second processor 1503.

Various components may be coupled together through a second bus system 1504. Understandably, the second bus system 1504 is configured to implement connection and communication among these components. In addition to a data bus, the second bus system 1504 may further include a power bus, a control bus, and a status signal bus. However, for clarity of description, various buses are marked as the second bus system 1504 in FIG. 15.

The second communication interface 1501 may be configured to perform signal sending and receiving while performing information sending and receiving with another external network element.

The second memory 1502 may be configured to store a computer program executabe on the second processor 1503.

The second processor 1503 may be configured to execute the computer program to implement:

parsing a bitstream, and determining a value of first syntax element identification information;

in response to the first syntax element identification information indicating that model selection using a preset selection network model is enabled for a current block, determining the preset selection network model for the current block, and determining an in-loop filtering network model used to filter the current block according to the preset selection network model; and acquiring a reconstructed picture block of the current block through filtering the current block by using the in-loop filtering network model.

Optionally, as another embodiment, the second processor 1503 may further be configured to execute the computer program to implement the method according to any one of the foregoing embodiments.

Understandably, the second memory 1502 is similar to the first memory 1302 in terms of a hardware function, and the second processor 1503 is similar to the first processor 1303 in terms of a hardware function, which is not elaborated here.

The embodiment provides a decoder. The decoder may include a parsing unit, a second selecting unit, and a second filtering unit. In this way, model adaptive selection based on deep learning is introduced, not only improving coding performance, thereby improving encoding and decoding efficiencies, but also leading to a final output reconstructed picture block closer to an original picture block, improving quality of a video picture.

Note that in the disclosure, a term such as "including/comprising", "containing", or any other variant of the term is intended to cover a non-exclusive inclusion, such that a process, method, article, or device including a series of elements not only includes the elements, but also includes other element(s) not explicitly listed, or element(s) inherent to such a process, method, article, or device. Given no more limitation, an element defined by a phrase "including a . . . " does not exclude existence of another identical element in a process, method, article, or device that includes the element.

Numbering of embodiments of the disclosure is merely for illustration and does not indicate preference of one embodiment over another.

Methods disclosed in method embodiments of the disclosure may be combined with each other as needed to acquire a new method embodiment, as long as no conflict results from the combination.

Features disclosed in product embodiments of the disclosure may be combined with each other as needed to acquire a new product embodiment, as long as no conflict results from the combination.

Features disclosed in method or device embodiments of the disclosure may be combined with each other as needed to acquire a new method or device embodiment, as long as no conflict results from the combination.

What described is just embodiments of the disclosure and is not intended to limit the scope of the disclosure. Any modification, equivalent replacement, and/or the like made within the technical scope of the disclosure, as may occur to a person having ordinary skill in the art, shall be included in the scope of the disclosure. The scope of the disclosure thus should be determined by the claims.

INDUSTRIAL APPLICABILITY

In embodiments of the disclosure, an encoder determines a value of first syntax element identification information. When the first syntax element identification information indicates that model selection using a preset selection network model is enabled for a current block, the encoder determines the preset selection network model for the current block, and determines an in-loop filtering network model used to filter the current block according to the preset selection network model. The encoder acquires a reconstructed picture block of the current block through filtering the current block by using the in-loop filtering network model. A decoder determines a value of first syntax element identification information by parsing a bitstream. When the first syntax element identification information indicates that model selection using a preset selection network model is enabled for a current block, the decoder determines the preset selection network model for the current block, and determines an in-loop filtering network model used to filter the current block according to the preset selection network model. The decoder acquires a reconstructed picture block of the current block through filtering the current block by using the in-loop filtering network model. In this way, model adaptive selection based on deep learning is introduced. An in-loop filtering network model is selected from at least one candidate in-loop filtering network model using a preset selection network model, and then a current block is filtered according to the selected in-loop filtering network model, not only improving coding performance, thereby improving encoding and decoding efficiencies, but also leading to a final output reconstructed picture block closer to an original picture block, improving quality of a video picture.

The invention claimed is:

1. A decoding method, applied to a decoder, the method comprising:

parsing a bitstream, and determining a value of first syntax element identification information;

in response to the first syntax element identification information indicating that model selection using a preset selection network model is enabled for a current block, determining the preset selection network model for the current block, determining an output value corresponding to each of at least one candidate in-loop filtering network model according to the preset selection network model, and determining an in-loop filtering network model used for the current block according to the output value corresponding to each of the at least one candidate in-loop filtering network model; and acquiring a reconstructed picture block of the current block through filtering the current block by using the in-loop filtering network model, wherein the preset selection network model consists of a plurality of convolutional neural network (CNN) layers and a plurality of fully connected neural network layers.

2. The decoding method of claim 1, wherein determining the output value corresponding to each of the at least one candidate in-loop filtering network model according to the preset selection network model comprises:

determining an input reconstructed picture block of the in-loop filtering network model; and inputting the input reconstructed picture block to the preset selection network model, and acquiring the output value corresponding to each of the at least one candidate in-loop filtering network model.

3. The decoding method of claim 1, wherein determining the in-loop filtering network model used for the current block according to the output value corresponding to each of the at least one candidate in-loop filtering network model comprises:

determining a target value from the output value corresponding to each of the at least one candidate in-loop filtering network model, and taking a candidate in-loop filtering network model corresponding to the target value as the in-loop filtering network model used for the current block;

wherein determining the target value from the output value corresponding to each of the at least one candidate in-loop filtering network model comprises:

selecting a maximum value from the output value corresponding to each of the at least one candidate in-loop filtering network model, and taking the maximum value as the target value.

4. The decoding method of claim 1, further comprising:

in response to the value of the first syntax element identification information being a first value, determining that the first syntax element identification information indicates that model selection using the preset selection network model is enabled for the current block; or in response to the value of the first syntax element identification information being a second value, determining that the first syntax element identification information indicates that model selection using the preset selection network model is disabled for the current block.

5. The decoding method of claim 1, further comprising:

parsing the bitstream, and determining a value of second syntax element identification information; and in response to the second syntax element identification information indicating that a video sequence is filtered by using the in-loop filtering network model, determining a value of a third syntax element identification information by parsing the bitstream, wherein the third syntax element identification information indicates whether a current picture in the video sequence is filtered by using the in-loop filtering network model, and the current picture comprises the current block;

wherein the decoding method further comprises:

in response to the value of the second syntax element identification information being a first value, determining that the second syntax element identification information indicates that the video sequence is filtered by using the in-loop filtering network model; or in response to the value of the second syntax element identification information being a second value, determining that the second syntax element identification information indicates that the video sequence is not filtered by using the in-loop filtering network model.

6. The decoding method of claim 5, wherein determining the value of the third syntax element identification information by parsing the bitstream comprises:

parsing the bitstream, and acquiring first luma syntax element identification information corresponding to a luma component of the current picture, the first luma syntax element identification information indicating whether the luma component of the current picture is filtered by using a luma in-loop filtering network model; or parsing the bitstream, and acquiring chroma syntax element identification information corresponding to a chroma component of the current picture, the chroma syntax element identification information indicating whether the chroma component of the current picture is filtered by using a chroma in-loop filtering network model.

7. The decoding method of claim 6, wherein for the luma component of the current picture, parsing the bitstream and determining the value of the first syntax element identification information comprises:

in response to the first luma syntax element identification information indicating that the luma component of the current picture is filtered by using the luma in-loop filtering network model, determining a value of second luma syntax element identification information by parsing the bitstream; and in response to the second luma syntax element identification information indicating that a luma component of the current block is filtered by using the luma in-loop filtering network model, determining the value of the first syntax element identification information by parsing the bitstream.

8. The decoding method of claim 7, further comprising:

in response to the value of the first luma syntax element identification information being the first value, determining that the first luma syntax element identification information indicates that the luma component of the current picture is filtered by using the luma in-loop filtering network model; or in response to the value of the first luma syntax element identification information being the second value, determining that the first luma syntax element identification information indicates that the luma component of the current picture is not filtered by using the luma in-loop filtering network model.

9. The decoding method of claim 7, further comprising:

in response to the value of the second luma syntax element identification information being the first value, determining that the second luma syntax element identification information indicates that the luma component of the current block is filtered by using the luma in-loop filtering network model; or in response to the value of the second luma syntax element identification information being the second value, determining that the second luma syntax element identification information indicates that the luma component of the current block is not filtered by using the luma in-loop filtering network model.

10. The decoding method of claim 6, wherein for the chroma component of the current picture, parsing the bitstream and determining the value of the first syntax element identification information comprises:

in response to the chroma syntax element identification information indicating that the chroma component of the current picture is filtered by using the chroma in-loop filtering network model, determining the value of the first syntax element identification information by parsing the bitstream;

wherein the decoding method further comprises:

in response to the value of the chroma syntax element identification information being the first value, determining that the chroma syntax element identification information indicates that the chroma component of the current picture is filtered by using the chroma in-loop filtering network model; or in response to the value of the chroma syntax element identification information being the second value, determining that the chroma syntax element identification information indicates that the chroma component of the current picture is not filtered by using the chroma in-loop filtering network model.

11. The decoding method of claim 1, wherein determining the preset selection network model for the current block comprises:

determining a luma selection network model for the current block in response to a colour component type of the current block being a luma component; and determining a chroma selection network model for the current block in response to the colour component type of the current block being a chroma component, wherein determining the output value corresponding to each of the at least one candidate in-loop filtering network model according to the preset selection network model comprises:

in response to the colour component type of the current block being the luma component, determining an output value corresponding to each of at least one candidate luma in-loop filtering network model according to the luma selection network model; and in response to the colour component type of the current block being the chroma component, determining an output value corresponding to each of at least one candidate chroma in-loop filtering network model according to the chroma selection network model.

12. The decoding method of claim 11, wherein the at least one candidate luma in-loop filtering network model is determined by performing model training on a first neural network structure according to at least one training sample, and the at least one candidate luma in-loop filtering network model has a corresponding relationship with the colour component type and a quantization parameter (QP);

wherein the first neural network structure comprises a first convolution module, a first residual module, a second convolution module, and a first connected module, wherein the first convolution module, the first residual module, the second convolution module, and the first connected module are connected in sequence, and the first connected module is further connected with an input of the first convolution module;

wherein the first convolution module consists of one convolution layer and one activation layer, the second convolution module consists of two convolution layers and one activation layer, the first connected module consists of a concatenation layer, and the first residual module comprises several residual blocks each consisting of two convolution layers and one activation layer.

13. A decoder, comprising a second memory and a second processor, wherein the second memory is configured to store thereon a computer program executable for the second processor, wherein the second processor is configured to implement the decoding method of claim 1 when executing the computer program.

14. An encoding method, applied to an encoder, the method comprising:

determining a value of first syntax element identification information;

in response to the first syntax element identification information indicating that model selection using a preset selection network model is enabled for a current block, determining the preset selection network model for the current block, determining an output value corresponding to each of at least one candidate in-loop filtering network model according to the preset selection network model, and determining an in-loop filtering network model used for the current block according to the output value corresponding to each of the at least one candidate in-loop filtering network model; and acquiring a reconstructed picture block of the current block through filtering the current block by using the in-loop filtering network model, wherein the preset selection network model consists of a plurality of convolutional neural network (CNN) layers and a plurality of fully connected neural network layers.

15. The encoding method of claim 14, wherein determining the output value corresponding to each of the at least one candidate in-loop filtering network model according to the preset selection network model comprises:

determining an input reconstructed picture block of the in-loop filtering network model; and inputting the input reconstructed picture block to the preset selection network model, and acquiring the output value corresponding to each of the at least one candidate in-loop filtering network model.

16. The encoding method of claim 14, wherein determining the in-loop filtering network model used for the current block according to the output value corresponding to each of the at least one candidate in-loop filtering network model comprises:

determining a target value from the output value corresponding to each of the at least one candidate in-loop filtering network model, and taking a candidate in-loop filtering network model corresponding to the target value as the in-loop filtering network model used for the current block;

wherein determining the target value from the output value corresponding to each of the at least one candidate in-loop filtering network model comprises:

selecting a maximum value from the output value corresponding to each of the at least one candidate in-loop filtering network model, and taking the maximum value as the target value.

17. The encoding method of claim 14, further comprising:

after having determined the in-loop filtering network model used for the current block, determining an index number of an in-loop filtering network model corresponding to the in-loop filtering network model; and encoding the index number of the in-loop filtering network model, and signalling an encoded bit in a bitstream;

wherein determining the value of the first syntax element identification information comprises:

in response to that model selection using the preset selection network model is enabled for the current block, determining the value of the first syntax element identification information to be a first value; or in response to that model selection using the preset selection network model is disabled for the current block, determining the value of the first syntax element identification information to be a second value.

18. The encoding method of claim 14, wherein a video sequence comprises a current picture, the current picture comprises the current block, and the method further comprises:

in response to determining that the video sequence is filtered by using the in-loop filtering network model, determining a value of second syntax element identification information to be a first value; or in response to determining that the video sequence is not filtered by using the in-loop filtering network model, determining the value of the second syntax element identification information to be a second value;

wherein the encoding method further comprises: after having determined that the video sequence is filtered by using the in-loop filtering network model, determining a first rate distortion cost of filtering a luma component of the current picture by using a luma in-loop filtering network model, and determining a second rate distortion cost of filtering the luma component of the current picture without using the luma in-loop filtering network model;

determining a value of first luma syntax element identification information to be the first value in response to the first rate distortion cost being less than the second rate distortion cost; and/or determining the value of the first luma syntax element identification information to be the second value in response to the first rate distortion cost being greater than or equal to the second rate distortion cost.

19. An encoder, comprising a first memory and a first processor, wherein the first memory is configured to store thereon a computer program executable for the first processor, wherein the first processor is configured to implement the encoding method of claim 14 when executing the computer program.

* * * * *